(12) United States Patent
Hamm et al.

(10) Patent No.: US 11,261,333 B2
(45) Date of Patent: Mar. 1, 2022

(54) CERAMIC COLOURS

(71) Applicant: Merck Patent GmbH, Darmstadt (DE)

(72) Inventors: Lukas Hamm, Otzberg (DE); Carsten Handrosch, Ober-Ramstadt (DE); Marc Hunger, Viernheim (DE); Jens Kersten, Lautertal (DE); Cairon Platzer, Darmstadt (DE); Markus Thong, Lorsch (DE); Khwan Khung Lim, Singapore (SG)

(73) Assignee: Merck Patent GmbH, Darmstadt (DE)

( * ) Notice: Subject to any disclaimer, the term of this patent is extended or adjusted under 35 U.S.C. 154(b) by 90 days.

(21) Appl. No.: 16/402,328

(22) Filed: May 3, 2019

(65) Prior Publication Data
US 2019/0338134 A1 Nov. 7, 2019

(30) Foreign Application Priority Data
May 4, 2018 (SG) .............. 10201803809S

(51) Int. Cl.
| | | |
|---|---|---|
| C09C 1/00 | (2006.01) | |
| C09C 1/04 | (2006.01) | |
| C09C 1/24 | (2006.01) | |
| C09C 1/30 | (2006.01) | |
| C09C 1/34 | (2006.01) | |
| C09C 1/36 | (2006.01) | |
| C09C 3/12 | (2006.01) | |
| C09D 1/04 | (2006.01) | |
| C09D 5/36 | (2006.01) | |

(52) U.S. Cl.
CPC .......... *C09C 1/0015* (2013.01); *C09C 1/0084* (2013.01); *C09C 1/043* (2013.01); *C09C 1/245* (2013.01); *C09C 1/30* (2013.01); *C09C 1/346* (2013.01); *C09C 1/3607* (2013.01); *C09C 3/12* (2013.01); *C09D 1/04* (2013.01); *C09D 5/36* (2013.01)

(58) Field of Classification Search
CPC ... C09C 1/0015; C09C 1/0009; C09C 1/0021; C09C 1/0027; C09C 3/12; C09C 1/245; C09D 5/36; C09D 1/04
See application file for complete search history.

(56) References Cited

U.S. PATENT DOCUMENTS

| | | | | |
|---|---|---|---|---|
| 3,015,574 A | * | 1/1962 | Gobel | B44C 1/1756 428/40.8 |
| 4,353,991 A | | 10/1982 | Van Ness et al. | |
| 4,472,510 A | * | 9/1984 | January | C03C 1/006 428/428 |
| 4,761,389 A | * | 8/1988 | Rabe | C04B 35/571 501/88 |
| 5,022,923 A | | 6/1991 | Rau et al. | |
| 5,783,506 A | | 7/1998 | Eppler et al. | |
| 6,524,641 B1 | * | 2/2003 | de Witzmann | C03C 8/14 264/406 |
| 6,596,070 B1 | * | 7/2003 | Schmidt | C03C 17/3417 106/417 |
| 6,863,923 B1 | | 3/2005 | Kalleder et al. | |
| 7,172,812 B2 | | 2/2007 | Greiwe et al. | |
| 7,553,519 B2 | | 6/2009 | Florent et al. | |
| 8,772,407 B2 | | 7/2014 | Mowrer | |
| 10,154,544 B2 | | 12/2018 | Dufour et al. | |
| 10,214,651 B2 | | 2/2019 | Hamm et al. | |
| 2006/0084743 A1 | * | 4/2006 | Chen | C08L 83/00 524/445 |
| 2006/0263531 A1 | * | 11/2006 | Lichtenhan | C23C 18/00 427/377 |
| 2014/0291313 A1 | * | 10/2014 | Dufour | H05B 3/74 219/460.1 |
| 2015/0037563 A1 | * | 2/2015 | Bockmeyer | C03C 17/007 428/312.8 |
| 2017/0107379 A1 | * | 4/2017 | Hamm | C09C 1/0027 |
| 2018/0079916 A1 | | 3/2018 | Roland | |

FOREIGN PATENT DOCUMENTS

| | | |
|---|---|---|
| CN | 101462895 A | 6/2009 |
| DE | 3932424 C1 | 6/1991 |
| DE | 19859420 A1 | 6/2000 |
| DE | 19946712 A1 | 4/2001 |
| EP | 0220509 B1 | 11/1989 |
| EP | 0307771 B1 | 7/1991 |
| EP | 0419843 B1 | 11/1994 |
| EP | 1084198 B1 | 7/2002 |
| EP | 3159380 A1 | 4/2017 |
| EP | 2665789 B1 | 3/2018 |
| EP | 3159380 B1 | 8/2019 |
| FR | 2868066 B1 | 6/2006 |
| GB | 2096592 A1 | 10/1982 |
| WO | 11144671 A1 | 11/2011 |
| WO | 16156603 A1 | 10/2016 |

OTHER PUBLICATIONS

Office Action in corresponding EP19171600.0 dated Sep. 20, 2019 (pp. 1-7).

* cited by examiner

*Primary Examiner* — Pegah Parvini

(74) *Attorney, Agent, or Firm* — Millen White Zelano and Branigan, PC; Csaba Henter

(57) ABSTRACT

Ceramic colours containing effect pigments and a liquid glass forming component for decoration of metallic, ceramic and glassy articles and a process for the preparation of a ceramic glaze.

22 Claims, 2 Drawing Sheets

CERAMIC COLOURS

The invention relates to ceramic colours comprising effect pigments and a liquid glass forming component for decoration of metallic, ceramic and glassy articles and to a process for the preparation of a ceramic glaze.

In general, decorative applications in ceramic glazes use mixtures of pigments, for example effect pigments, and ceramic frits/frit mixtures. The firing temperature and the composition of the frit are determined by the article to be coated. Typical firing temperature ranges for different applications are for example:
enamel at 500-850° C.,
glass at 550-650° C.,
triple-fired crockery at 740-900° C.,
triple-fired tiles at 900-1150° C.,
single-fired crockery at 1000-1300° C.,
single-fired tiles at 1100-1250° C.

The temperature of the firing process has to be sufficiently high for the respective application to ensure that abrasion-resistant and closed coatings are made from the ceramic colour. The firing temperature is oriented towards the softening or melting temperature of the respective glass frit. The glass particles being present at the beginning soften then and form a continuous matrix and a smooth surface. Here the problem occurs that the pigments, in particular the representatives from the class of the pearlescent pigments, generally do not survive the aggressive conditions consisting of oxidic melt (frit components) and high temperatures during the firing process without damage.

It is known from the prior art that a significant loss in tinting strength and pearlescent effect must be expected on use of pearlescent pigments in ceramic or glassy coatings.

In order to prevent this, these pigments must either be encapsulated in additional protective layers, or alternatively the use of pearlescent pigments in this high-temperature area of application is limited special combinations of pearlescent pigments and modified engobes or fluxes.

Efforts have therefore been made in the past to optimise the pearlescent effect in decorative applications on ceramic articles by application-technical modifications, e.g. varying particle form and size of frit particles, varying the chemical composition of frit particles or enhancing pigment concentration. Furthermore, efforts have been made to stabilise the effect pigments, in particular pearlescent pigments, by sheathing with insulating protective layers for such thermally and chemically extremely highly demanding applications of this type.

This is described in EP 3 159 380 A1. EP 220 509 A1, EP 307 771 A1, EP 307 771 A1, DE 39 32 424 C1, GB 2 096 592 A, U.S. Pat. Nos. 5,783,506, 4,353,991, EP 0 419 843 A1, CN 101462895A, and DE 198 59 420 A1.

These solutions known from the prior art, such as, for example, the encapsulation of the pigments, are complex in production, since a further process step for application of the protective layer must be carried out in production. In addition, disadvantageous effects, such as, for example, clouding of the glaze and colour changes in the pigment or poorer control of the colour effect in the application medium, may occur, depending on the composition of the protective layer.

The second approach by application-technical modifications such as pigment concentration, composition and form of frit particles always require a sufficiently high temperature to ensure film formation of the ceramic colour. A smooth and mechanically stable layer can be ensured by a high alkali concentration of the frit or by a sufficiently high temperature. Both variants might negatively influence the effect pigment, tending to decompose under such harsh conditions.

Furthermore, it is known from the state of the art that the orientation of effect pigments may be influenced during coating. This is described in WO 2016/156603 and EP 1 084 198 B1.

EP 3 159 380 A1 describes how to vary form and size of a frit to influence the orientation of effect pigments in a pigment/frit mixture.

Although several methods and mixtures are known in the state of the art, none of them serves all needs for forming ceramic glazes on ceramic, metallic or glasslike bodies like tiles or porcelain, especially not at firing temperatures between 700° C. and 1300° C. respectively on metallic bodies like enamel at firing temperatures between 450° C. and 850° C.

It was therefore the object of the present invention to develop a ceramic colour containing pearlescent pigments which do not show the disadvantages of state of the art methods and compositions.

Surprisingly, it has now been found that by use of ceramic colours comprising effect pigments and a liquid glass forming component for the preparation of ceramic glazes disadvantages of the combination of a particulate frit and pearlescent pigments can be avoided.

The present invention therefore relates to a ceramic colour comprising at least one effect pigment based on flake-form substrates and/or uncoated flake-form substrates with a refractive index R.I. >1.5, and at least one liquid glass forming component, and optionally a solvent, optionally a binder, optionally an absorptive ceramic pigment and optionally at least one additive. Furthermore, the invention relates to a process for the preparation of ceramic glazes and glazed articles using such ceramic colours and the invention also relates to articles comprising a ceramic glaze made from the ceramic colours according to the invention. Glazes for ceramic bodies are preferably fired at a temperature ≥700° C., respectively for a metallic body at a temperature ≥450° C.

Preferably, ceramic colours according to the invention eliminated or at least diminish the problem of strong loss of colour effect that is caused by the finite dimension of the frit particles which leads to a disorientation of the effect pigment particles as shown in FIG. 1.

Advantageously, the invention provides an optimal orientation of the effect pigments based on flake-form substrates like e.g. synthetic mica flakes, natural mica flakes, glass flakes and silica flakes, flakes consisting of $Al_2O_3$, SiC, $Si_xN_yC_z$ (with x=0.5-1.0; y=0.25-0.5; z=0.25-0.5), $B_4C$, BN, graphite, $TiO_2$ and $Fe_2O_3$ as shown FIG. 2 and the pearlescent effect and tinting strength can be improved. Especially $Al_2O_3$ flakes, SiC flakes, $B_4C$ flakes, BN flakes, graphite flakes, $TiO_2$ flakes, and $Fe_2O_3$ flakes can be used.

Preferably, the proportion of effect pigment in the ceramic colour is at least 0.1% by weight based on the liquid glass forming component. Preferably, pearlescent pigments may be used.

Flake-form substrates with refractive index larger than that of the applied ceramic glaze (approx. >1.5) can also be used or added in pure form (without any coating). In this case an attractive sparkle effect can be obtained. Preferably, uncoated flake-form substrates with R.I. >1.5 selected from the group consisting of $Al_2O_3$ flakes, SiC flakes, $Si_xN_yC_z$ flakes (with x=0.5-1.0; y=0.25-0.5; z=0.25-0.5); $B_4C$ flakes, BN flakes, graphite flakes, $TiO_2$ flakes, and $Fe_2O_3$ flakes are used, especially $Al_2O_3$ flake, SiC flakes, $B_4C$ flakes, BN flakes, graphite flakes, TiO$_2$ flakes, and Fe$_2$O$_3$ flakes. The proportion of uncoated flake-form substrates in the ceramic colour may be at least 0.1% by weight based on the liquid glass forming component.

In ceramic colours according to the invention, effect pigments based on flake-form substrates as well as uncoated flake-form substrates with a refractive index>1.5 may be used alone or in combination with each other. Preferably, effect pigments based on flake-form substrates are used.

Contrary to most pigment/frit mixtures of the state of the art, ceramic colours comprising at least one effect pigment based on flake-form substrates like e.g. synthetic mica flakes, natural mica flakes, glass flakes and silica flakes, flakes consisting of Al$_2$O$_3$, SiC, Si$_x$N$_y$C$_z$ (with x=0.5-1.0; y=0.25-0.5; z=0.25-0.5), B$_4$C, BN, graphite, TiO$_2$ and Fe$_2$O$_3$ and at least one liquid glass forming component can positively influence the orientation of effect pigments in ceramic glazes. Thus, it is advantageous that the glassy structure is formed during the firing process and the present invention provides an improved pearlescent effect at respective temperature.

The nearly plane-parallel orientation of the effect pigments leads to the improved pearlescent effect. This shows up with a definitely enhanced chroma and a better gloss of the decorative coating. Chroma and gloss can be judged optically but can also be measured by commercial colour measuring instruments of Byk, X-rite or Minolta and can be compared to examples of the state of the art. The improved orientation can also be shown by sectional figures. Furthermore, extreme smooth surfaces, which also contribute to high gloss, can be prepared by use of the liquid glass forming component.

A good pearlescent effect and a high chroma are given when the average angle between pigment particles and the projected surface of the coating lies between 0° and 30°. In particular, an angle of 0° respectively 180° or 360° is preferred, which describes a plane-parallel orientation.

In addition, the deviation from the average angle should not be more than 30°, especially below 10°. In a particularly preferred variant, the average angle to the surface is 0° (180°) and the maximum deviation is ±10°.

The present invention also relates to a process for the preparation of a ceramic glaze wherein a ceramic colour comprising at least one effect pigment based on flake-form substrates and at least one liquid glass forming component is applied to an article and fired at a temperature ≥700° C.

Surprisingly, the ceramic colours and the process according to the invention are suitable for the decoration of ceramic articles like tiles or porcelain at temperatures ≥700° C., preferably ≥800° C., in particular ≥1000° C.

It is an advantage of the present invention that the loss of pearlescent effect and tinting strength can be reduced. Preferably, a considerably strong pearlescent effect and a higher tinting strength can be achieved compared to methods of the state of the art.

Ceramic articles comprising a glaze made according to the invention can preferably provide the advantage that the desired optical effects are stable and accessible in a reproducible manner in high-temperature applications ≥1100° C., preferably >1100° C.

The liquid glass forming component preferably comprises the components that are necessary for the preparation of a glassy matrix. Depending on the firing temperature the composition of the matrix can be derived based on common glass compositions. Advantageously, by adjusting the viscosity of the ceramic colour the orientation of the flake-form pigments can be positively influenced.

Applicable liquid glass forming components are for example sol-gel materials, alkoxides, laquers, liquid polymers or resins, which change into known glass components during the firing process. Usually, oxides of the following metals or semi-metals may be used: silicon, rubidium, caesium, beryllium, lead, magnesium, calcium, strontium, barium, boron, aluminum, titanium, vanadium, germanium, zirconium, tin, and zinc.

Preferred sol-gel systems consist of pure or organo-functionalized metal-alkoxides and/or silicon compounds. Without limiting the general use of metal-oxide precursors the preferred metal-oxide precursors are selected from the group of metal-alkoxides.

Sol-gel components and the process for their preparation are known in the art. The glassy matrix-forming sol-gel components are preferably obtainable by partial hydrolysis and condensation of at least one metal-organic metal-oxide precursor. Preferred examples are alkoxysilanes, especially tetraethoxysilane (TEOS) and organofunctional silanes but also pure or organo-functionalized alkoxymetallates like e.g. tetra-ethoxy-titanate. As known from literature in the sol-gel chemistry a wide variation of metal oxide precursors can be combined. By proper selection of the combination of metal-oxide precursors the final property of the ceramic glaze can be widely adjusted. The sol-gel system can be further modified by the addition of metal-halogenides like e.g. CaCl$_2$, SnCl$_4$ or CeCl$_3$ or other metal salts. The final conversion into a glassy matrix takes place during the firing process.

Preferred liquid polymers are selected from polysiloxanes, polysilazanes (perhydropolysilazanes as well as organopolysilazanes), polysilsesquioxanes, polycarbosilanes, polycarbosiloxanes, polysilanes, polysilylcarbodiimides, polysilsesquicarbodiimides, polysilsesquiazanes, polyborosilanes, polyborosilazanes, polyborosiloxanes, polysilazane/polysiloxane block copolymers, and polysiloxazanes. Mixtures of silicon comprising polymers may also be used.

For example polysilsesquioxane polymers of the following formula can be used:

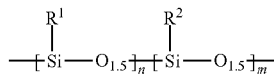

whereas
R$^1$ and R$^2$ are radicals equal or different from each other and are selected from the group consisting of hydrogen, alkyl, alkene, cycloalkyl, aryl, arylene and alkoxyl, and
m and n is, independently from each other, an integer selected from the numbers in the range of from 1 to 100, with the proviso that the boiling point of each of the materials is exceeding 150° C.

Additionally, the ceramic colour may comprise binders for example silicon containing polymers or silicon containing resins. Commercial resins are for example available by Wacker under the tradename Silres or by Arkema under the tradename Synolac. However, the selection of binder is generally not limited to silicon containing resins. As long as compatibility is given all kind of organic binders can be used, like e.g. polyester, polyurethane, epoxy, alkyd, acrylate etc.

Besides these components, the ceramic color may comprise further fillers, additives (e.g. dispersing additives, rheology additives, thickener, defoamer), solvents such as screen printing oils or ceramic absorptive pigments like e.g. green chromium-oxide pigments, black spinel pigments, buff-rutile-pigments, cadmium red and yellow, cobalt-blue pigments, commercially available by Shepperd or Ferro. Additives are available by BYK or other manufacturer. Examples for possible additives are: Aerosil, Byk 405, Byk 410, Mowital B 30 H (Kuraray), Crayvallac PA3 BA 20 (Arkema), Byk 065, Koralision Entschäumer FG 100, TEGO Dispers 652.

For the preparation of fine colour grids and relief-like prints on ceramic substrates by means of ceramic colours, use is made of screen printing oils or rheology additives, which prevent running of the colour pastes after printing and give rise to prints with sharp contours. Furthermore, screen printing oils ensure suitability of the ceramic colour for application on transfer printing paper. An Example for screening printing oil are the commercially available 221-ME and Screenprint Bulk 803035 MR by Ferro.

The proportion of effect pigment in the ceramic colour is preferably at least 0.1%, especially 0.1-99.9%, by weight based on the liquid glass forming component. Further preferred ranges may be 0.1-98%, 0.5-95%, and 1-91% by weight based on the liquid glass forming component.

Especially in these embodiments of the invention, the preferred liquid glass forming components may be used.

The proportion of uncoated flake-form substrates in the ceramic colour may be the same as for the effect pigments.

Preferably, ceramic colours according to the invention comprise 0.1-99.9% by weight of at least one effect pigment and/or at least one uncoated flake-form substrate, 0.1-99.9% by weight of at least one glass forming component, 0-50% by weight of at least one solvent, 0-90% by weight of at least one binder, 0-20% by weight of at least one additive, where percentages are based on the weight of the ceramic colour and add to 100%.

The temperature at which a close and mechanically stable glassy film on the workpiece is formed, lies preferably below the temperature that is necessary for usual methods by glass frits. Since in the process according to the invention the glass layer forms during the firing process and a temperature near the melting point of the glass can be avoided, a smooth and mechanically stable film can be formed without common means like high temperature or high alkali content. Therefore, the pigment stability is not negatively influenced and there is no danger that the pigment decomposes at high temperatures in the oxidic melt and the pearlescent effect is lost.

Furthermore, this route helps to avoid aggressive and counterproductive alkali glass components. A certain amount of alkali is necessary for the state of the art methods to adopt the glass melting point to the respective temperature window of the firing process of the work piece to be coated.

This limitation does not exist for the ceramic colour according to the invention. Advantageously the temperature window can be defined by the choice of the liquid glass forming components and a high chromatic pearlescent effect can be achieved at every firing temperature.

All known effect pigments are suitable for the invention, in particular pearlescent pigments. The effect pigments may preferably be based on substrates selected from synthetic mica flakes, natural mica flakes, silica flakes, glass flakes and very particularly preferably based on high-temperature-resistant flakes, such as, for example, $Al_2O_3$ flakes, SiC flakes, $B_4C$ flakes, BN flakes, graphite flakes, $TiO_2$ flakes and $Fe_2O_3$ flakes, especially $Al_2O_3$ flakes.

Finally, particularly high temperature stability is generally achieved if use is made of pearlescent pigments based on flake-form substrates which are stable at high temperatures. Examples which may be mentioned here are: corundum—$Al_2O_3$, carborundum—SiC, boron nitride—BN, graphite and haematite—$Fe_2O_3$.

It is also possible to employ mixtures of different substrates or mixtures of the same substrates having different particle sizes. The substrates can be mixed with one another in any weight ratio. 10:1 to 1:10 mixtures are preferably employed, in particular 1:1 mixtures. Particular preference is given to substrate mixtures consisting of substrate flakes having different particle sizes, in particular mixtures of S fraction (10-200 μm), N fraction (10-60 μm) and F fraction (5-25 μm), but also of F fraction (5-25 μm) and M fraction (1-15 μm).

The size of the base substrates is not crucial per se and can be matched to the particular application and desired target effect/target texture: for example, satin or highly glittering.

In general, the flake-form substrates have a thickness of 0.05-5 μm, preferably 0.1-2 μm, in particular 0.1-1 μm. The size in the two other dimensions is usually 1-500 μm, preferably 1-250 μm and in particular 1-60 μm.

Uncoated flake-form substrates may be used in the ceramic colour according to the invention in same or similar embodiments like substrates used for the effect pigments.

The thickness of at least one individual layer on the base substrate of the pearlescent pigment is essential for the optical properties of the pigment, as already described in numerous patents and patent applications, for example in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

The pigment must have at least one optically active layer, preferably a high-refractive-index layer (for example $TiO_2$, $Fe_2O_3$, $SnO_2$, etc.). High-refractive-index layers here are taken to mean all layers which have a refractive index of $n \geq 1.8$, preferably of $n \geq 2.0$.

Suitable substrate flakes for the pearlescent pigments may be doped or undoped. If they are doped, the doping is preferably Al, N, B, Ti, Zr, Si, In, Sn or Zn or mixtures thereof. Furthermore, further ions from the group of the transition metals (V, Cr, Mn, Fe, Co, Ni, Cu, Y, Nb, Mo, Hf, Ta, W) and ions from the group of the lanthanides may serve as dopants.

In the case of $Al_2O_3$, the substrate is preferably undoped or doped with $TiO_2$, $ZrO_2$ or ZnO. The $Al_2O_3$ flakes are preferably corundum. Suitable $Al_2O_3$ flakes are preferably doped or undoped $\alpha$-$Al_2O_3$ flakes, in particular $TiO_2$-doped $\alpha$-$Al_2O_3$ flakes. If the substrate is doped, the proportion of the doping is preferably 0.01-5.00% by weight, in particular 0.1-3.00% by weight, based on the substrate.

Suitable $Al_2O_3$ flakes have an equivalence diameter distribution according to which 90% of the particles are in the range 5-45 μm, preferably 5-40 μm.

The $D_{50}$ values of the $Al_2O_3$ flakes are preferably in the range 15-30 μm, very particularly preferably in the range from 15-25 μm.

The $D_{10}$ values are preferably in the range 5-15 μm, very particularly preferably in the range 6-10 μm.

Throughout the application, the $D_{10}$, $D_{50}$ and $D_{90}$ values are determined using a Malvern MS 2000.

The thickness of the $Al_2O_3$ flakes is preferably 50-1200 nm preferably 150-800 nm and in particular 200-450 nm.

In a very particularly preferred embodiment, the thickness of the $Al_2O_3$ flakes is <500 nm, preferably 150-450 nm and in particular 150-400 nm.

The aspect ratio (diameter/thickness ratio) of the $Al_2O_3$ flakes is preferably 10-1000, in particular 50-500.

In a further preferred embodiment, the aspect ratio of the $Al_2O_3$ flakes is 30-200, in particular 50-150.

In a preferred embodiment, the flake-form substrate is coated with one or more transparent, semi-transparent and/or opaque layers comprising metal oxides, metal oxide hydrates, metal silicates, metal suboxides, metals, metal fluorides, metal nitrides, metal oxynitrides or mixtures of these materials. The metal oxide, metal oxide hydrate, metal silicate, metal suboxide, metal, metal fluoride, metal nitride or metal oxynitride layers or the mixtures thereof can have a low refractive index (refractive index<1.8) or a high refractive index (refractive index≥1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, zirconium silicate $ZrSiO_4$, mullite, titanium oxide, in particular titanium dioxide, titanium oxide hydrate and mixtures thereof, such as, for example, ilmenite or pseudobrookite. Metal suboxides which can be employed are, for example, the titanium suboxides (for example $Ti_2O_3$ or $\gamma\text{-}Ti_3O_5$). Suitable metal silicates are aluminium silicate, Mg silicate, C silicate or Ba silicate; mixed alkaline-earth metal silicates, such as, for example, Ca/Mg silicate, Zr silicate or mixtures of the said silicates. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly preferably metal oxide and/or metal oxide hydrate layers are preferably applied to the support. Furthermore, multilayered structures comprising high- and low-refractive-index metal oxide, metal oxide hydrate, metal or metal fluoride layers may also be present, with high- and low-refractive-index layers preferably alternating. Particular preference is given to layer packages comprising a high-refractive-index layer and a low-refractive-index layer, where one or more of these layer packages may be applied to the support. The sequence of the high- and low-refractive-index layers here can be matched to the support in order to incorporate the support into the multilayered structure. In a further embodiment, the metal oxide, metal silicate, metal oxide hydrate, metal suboxide, metal, metal fluoride, metal nitride or metal oxynitride layers may be mixed or doped with colorants or other elements. Suitable colorants or other elements are, for example, inorganic coloured pigments, such as coloured metal oxides, for example magnetite, chromium(III) oxide or coloured pigments, such as, for example, Thenard's Blue (a Co/Al spinel) or elements, such as, for example, yttrium or antimony, and generally pigments from the structural class of the perovskites, pyrochlores, rutiles and spinels. Pearlescent pigments comprising these layers exhibit great colour variety with respect to their mass tone and may in many cases exhibit an angle-dependent change in colour (colour flop) due to interference.

In a preferred embodiment, the outer layer on the support is a high-refractive-index metal oxide. This outer layer may additionally be on the above-mentioned layer packages or, in the case of high-refractive-index supports, may be part of a layer package and consist, for example, of $TiO_2$, titanium suboxides, MnO, CuO, $CuCr_2O_4$ $Fe_2O_3$, $SnO_2$, ZnO, $ZrO_2$, $Ce_2O_3$, CoO, $Co_3O_4$, $V_2O_5$, $Cr_2O_3$ and/or mixtures thereof, such as, for example, ilmenite or pseudobrookite.

The thickness of the metal oxide, metal oxide hydrate, metal silicate, metal suboxide, metal, metal fluoride, metal nitride or metal oxynitride layers or a mixture thereof is usually 3 to 300 nm and, in the case of the metal oxide, metal oxide hydrate, metal suboxide, metal fluoride, metal nitride or metal oxynitride layers or a mixture thereof, preferably 20 to 200 nm. The thickness of the metal layers is preferably 4 to 50 nm.

The optical layer preferably consists of $TiO_2$, $ZrO_2$, $Fe_2O_3$, $Fe_3O_4$, $SnO_2$, ZnO, or mixtures or combinations thereof. The layer may be undoped or doped. Suitable dopants are, for example, alkaline-earth metals or compounds thereof, in particular calcium and magnesium. The doping proportion is generally a maximum of 5% by weight, based on the respective layer.

The optical layer is particularly preferably a $TiO_2$ layer, an $Fe_2O_3$ layer, a $TiO_2/Fe_2O_3$ mixed layer, a pseudobrookite layer ($Fe_2TiO_5$) or a combination of these layers in a multilayered system, such as, for example, $TiO_2$—$SiO_2$—$TiO_2$ or $Fe_2O_3$—$SiO_2$—$Fe_2O_3$.

The titanium dioxide may be present in the high-refractive-index coating in the rutile or anatase modification, preferably in the form of rutile. The processes for the preparation of rutile are described, for example, in the prior art in U.S. Pat. Nos. 5,433,779, 4,038,099, 6,626,989, DE 25 22 572 C2 and EP 0 271 767 B1. A thin tin oxide layer (<10 nm), which serves as additive in order to convert the $TiO_2$ into rutile, is preferably applied to the substrate flakes before the $TiO_2$ precipitation.

The thickness of the optically active layer is preferably in each case 30 to 350 nm, in particular 50 to 250 nm.

Pearlescent pigments based on flake-form substrates which are particularly preferred for the ceramic colour according to the invention are indicated below:

substrate flake+$TiO_2$ substrate flake+$Fe_2O_3$ substrate flake+$Fe_3O_4$ substrate flake+$TiO_2/Fe_2O_3$ substrate flake+$FeTiO_3$ substrate flake+$Fe_2TiO_5$ substrate flake+$ZrO_2$ substrate flake+ZnO substrate flake+$SnO_2$ substrate flake+$Cr_2O_3$ substrate flake+$Ce_2O_3$ substrate flake+$TiO_x$ (reduced), where $x$=1.50-1.95 substrate flake+$TiO_2$+$Fe_2O_3$ substrate flake+$TiO_2$+$Fe_3O_4$ substrate flake+$Fe_2O_3$+$TiO_2$ substrate flake+TiO$_2$+SiO$_2$+TiO$_2$ substrate flake+TiO$_2$+SnO$_2$+TiO$_2$ substrate flake+TiO$_2$+Al$_2$O$_3$+TiO$_2$ substrate flake+Fe$_2$O$_3$+SiO$_2$+TiO$_2$ substrate flake+TiO$_2$/Fe$_2$O$_3$+SiO$_2$+TiO$_2$ substrate flake+TiO$_2$/Fe$_2$O$_3$+SiO$_2$+TiO$_2$/Fe$_2$O$_3$ substrate flake+TiO$_2$/Fe$_2$O$_3$+SiO$_2$+TiO$_2$+TiO$_2$/Fe$_2$O$_3$ substrate flake+TiO$_2$+SiO$_2$+TiO$_2$/Fe$_2$O$_3$ substrate flake+TiO$_2$+SiO$_2$ substrate flake+TiO$_2$+Al$_2$O$_3$ substrate flake+TiO$_2$+MgO×SiO$_2$+TiO$_2$ substrate flake+Fe$_2$O$_3$+MgO×SiO$_2$+TiO$_2$ substrate flake+TiO$_2$/Fe$_2$O$_3$+MgO×SiO$_2$+TiO$_2$ substrate flake+TiO$_2$/Fe$_2$O$_3$+MgO×SiO$_2$+TiO$_2$/Fe$_2$O$_3$ substrate flake+TiO$_2$/Fe$_2$O$_3$+MgO×SiO$_2$+TiO$_2$+TiO$_2$/Fe$_2$O$_3$ substrate flake+TiO$_2$+MgO×SiO$_2$+TiO$_2$/Fe$_2$O$_3$ substrate flake+SnO$_2$+TiO$_2$+SiO$_2$+SnO$_2$+TiO$_2$ substrate flake+SnO$_2$+TiO$_2$+SnO$_2$+TiO$_2$ substrate flake+SnO$_2$+TiO$_2$+Fe$_2$O$_3$+SiO$_2$+SnO$_2$+TiO$_2$+Fe$_2$O$_3$ substrate flake+Fe$_2$O$_3$+SnO$_2$+TiO$_2$ substrate flake+Fe$_2$O$_3$+SnO$_2$+Fe$_2$O$_3$ substrate flake+TiO$_2$+SnO$_2$+TiO$_2$ substrate flake+TiO$_2$/Fe$_2$O$_3$+SnO$_2$+TiO$_2$ substrate flake+TiO$_2$/Fe$_2$O$_3$+SnO$_2$+TiO$_2$/Fe$_2$O$_3$ substrate flake+SnO$_2$+TiO$_2$+Fe$_2$O$_3$+SnO$_2$+TiO$_2$+Fe$_2$O$_3$.

substrate flake+Fe$_2$TiO$_5$+SnO$_2$+Fe$_2$TiO$_5$ substrate flake+Fe$_2$TiO$_5$+SiO$_2$+Fe$_2$TiO$_5$ In a further preferred embodiment, a first low-refractive-index layer is firstly applied to the substrate flake. Low-refractive-index layer in this application is taken to mean a layer which has a refractive index of <1.8.

The low-refractive-index layer on the substrate is preferably selected from the group Al$_2$O$_3$, SiO$_2$, zirconium silicate ZrSiO$_4$, mullite 3Al$_2$O$_3$×2SiO$_2$ or 2Al$_2$O$_3$×SiO$_2$ (sintered or fused mullite) or alkaline-earth metal silicate (MSiO$_3$, where M=Mg$^{2+}$, Ca$^{2+}$, Sr$^{2+}$ or Ba$^{2+}$, or M$_2$Si$_3$O$_8$, where M=Mg$^{2+}$, Ca$^{2+}$, Sr$^{2+}$ or Ba$^{2+}$).

Preferred pigments having a low-refractive-index layer (LRL) on the substrate surface are distinguished by the following structure:

substrate flake+LRL+TiO$_2$ substrate flake+LRL+Fe$_2$O$_3$ substrate flake+LRL+Fe$_3$O$_4$ substrate flake+LRL+TiO$_2$/Fe$_2$O$_3$ substrate flake+LRL+FeTiO$_3$ substrate flake+LRL+Fe$_2$TiO$_5$ substrate flake+LRL+ZrO$_2$ substrate flake+LRL+ZnO substrate flake+LRL+SnO$_2$ substrate flake+LRL+Cr$_2$O$_3$ substrate flake+LRL+Ce$_2$O$_3$ substrate flake+LRL+TiO$_x$ (reduced), where $x$=1.50-1.95 substrate flake+LRL+TiO$_2$+Fe$_2$O$_3$ substrate flake+LRL+TiO$_2$+Fe$_3$O$_4$ substrate flake+LRL+Fe$_2$O$_3$+TiO$_2$ substrate flake+LRL+TiO$_2$+SiO$_2$+TiO$_2$ substrate flake+LRL+TiO$_2$+SnO$_2$+TiO$_2$ substrate flake+LRL+TiO$_2$+Al$_2$O$_3$+TiO$_2$ substrate flake+LRL+Fe$_2$O$_3$+SiO$_2$+TiO$_2$ substrate flake+LRL+TiO$_2$/Fe$_2$O$_3$+SiO$_2$+TiO$_2$ substrate flake+LRL+TiO$_2$/Fe$_2$O$_3$+SiO$_2$+TiO$_2$/Fe$_2$O$_3$ substrate flake+LRL+TiO$_2$/Fe$_2$O$_3$+SiO$_2$+TiO$_2$+TiO$_2$/Fe$_2$O$_3$ substrate flake+LRL+TiO$_2$+SiO$_2$+TiO$_2$/Fe$_2$O$_3$ substrate flake+LRL+TiO$_2$+SiO$_2$ substrate flake+LRL+TiO$_2$+Al$_2$O$_3$ substrate flake+LRL+TiO$_2$+MgO×SiO$_2$+TiO$_2$ substrate flake+LRL+Fe$_2$O$_3$+MgO×SiO$_2$+TiO$_2$ substrate flake+LRL+TiO$_2$/Fe$_2$O$_3$+MgO×SiO$_2$+TiO$_2$ substrate flake+LRL+TiO$_2$/Fe$_2$O$_3$+MgO×SiO$_2$+TiO$_2$/Fe$_2$O$_3$ substrate flake+LRL+TiO$_2$/Fe$_2$O$_3$+MgO×SiO$_2$+TiO$_2$+TiO$_2$/Fe$_2$O$_3$ substrate flake+LRL+TiO$_2$+MgO×SiO$_2$+TiO$_2$/Fe$_2$O$_3$ substrate flake+LRL+SnO$_2$+TiO$_2$+SiO$_2$+SnO$_2$+TiO$_2$ substrate flake+LRL+SnO$_2$+TiO$_2$+SnO$_2$+TiO$_2$ substrate flake+LRL+SnO$_2$+TiO$_2$+Fe$_2$O$_3$+SiO$_2$+SnO$_2$+TiO$_2$+Fe$_2$O$_3$ substrate flake+LRL+Fe$_2$O$_3$+SnO$_2$+TiO$_2$ substrate flake+LRL+Fe$_2$O$_3$+SnO$_2$+Fe$_2$O$_3$ substrate flake+LRL+TiO$_2$+SnO$_2$+TiO$_2$ substrate flake+LRL+TiO$_2$/Fe$_2$O$_3$+SnO$_2$+TiO$_2$ substrate flake+LRL+TiO$_2$/Fe$_2$O$_3$+SnO$_2$+TiO$_2$/Fe$_2$O$_3$ substrate flake+LRL+SnO$_2$+TiO$_2$+Fe$_2$O$_3$+SnO$_2$+TiO$_2$+Fe$_2$O$_3$ substrate flake+LRL+Fe$_2$TiO$_5$+SnO$_2$+Fe$_2$TiO$_5$ substrate flake+LRL+Fe$_2$TiO$_5$+SiO$_2$+Fe$_2$TiO$_5$ It is also possible to use different pearlescent pigments as a mixture in the ceramic colour according to the invention. Preferably, only one type of pearlescent pigment is employed.

Preferred embodiments of the invention comprise the preferred effect pigments and/or uncoated flake-form substrates and the preferred liquid glass forming component. Especially preferred are combinations wherein all components are used in their particularly preferred variants. Particularly preferred are combinations of preferred effect pigments and preferred liquid glass forming components in their preferred proportions. Formulations comprising such combinations and screen printing oils are also preferred.

Layer or coating in this application is taken to mean the complete covering of the flake-form substrate.

The pearlescent pigments can be prepared relatively easily. The covering of substrate flakes is preferably carried out by wet-chemical methods, where the wet-chemical coating methods developed for the preparation of pearlescent pigments can be used. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

Furthermore, the coating of the substrates can also be carried out by gas-phase coating in a fluidised-bed reactor, where, for example, the processes proposed for the preparation of pearlescent pigments in EP 0 045 851 A1 and EP 0 106 235 A1 can be used correspondingly.

In the case of wet coating, the substrate particles are suspended in water, and one or more soluble metal salts are added at a pH which is suitable for hydrolysis, which is selected so that the metal oxides or metal oxide hydrates are precipitated directly onto the flakes without secondary precipitations occurring. The pH is usually kept constant by simultaneous metered addition of a base or acid. The pigments are subsequently separated off, washed and dried and optionally calcined, where the calcination temperature can be optimised with respect to the coating present in each case. In general, the calcination temperatures are between 250 and 1000° C., preferably between 350 and 900° C. If desired, the pigments can be separated off after application of individual coatings, dried and optionally calcined and then resuspended for precipitation of the further layers.

If, for example, a TiO$_2$ or TiO$_2$/Fe$_2$O$_3$ layer is to be reduced, the reduction of the finished pearlescent pigment is preferably carried out after drying by subsequently calcining the pigment at 500 to 1200° C., preferably at 500-1000° C., in particular at 500-800° C., for 0.5-5 h, preferably for 0.5-2 h, under reducing conditions, preferably under forming gas (N$_2$/H$_2$). On use of pigments which have been calcined under reducing conditions in the glaze, however, it has proven helpful likewise to select reducing conditions under the firing conditions for the workpiece to be glazed.

In order to improve the wettability and/or compatibility with the printing medium, it is frequently advisable, depending on the area of application, to subject the finished pearlescent pigment to inorganic or organic post-coating or post-treatment. Suitable post-coatings or post-treatments are, for example, the processes described in DE patent 22 15 191, DE-A 31 51 354, DE-A 32 35 017 or DE-A 33 34 598. This post-coating simplifies handling of the pigment, in particular incorporation into various media. In order to improve the wettability, dispersibility and/or compatibility with the application media, functional coatings comprising organic or combined organic/inorganic post-coatings may be possible, for example with silanes, as described, for example, in DE 10348174, EP 0090259, EP 0 342 533, EP 0 632 109, EP 0 888 410, EP 0 634 459, EP 1 203795, WO 94/01498, WO 96/32446, WO 99/57204, WO 2004/092284, U.S. Pat. Nos. 5,759,255, 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493. The post-coating merely comprises a proportion by weight of 0.1 to 5% by weight, preferably 0.5 to 3% by weight, based on the pearlescent pigment.

In a particular embodiment of the invention, the pearlescent pigments are hydrophobically or amphiphilically post-coated, which, on application via printing pastes, results in the advantage of more homogeneous distribution in the print medium and thus more homogeneous colour distribution on the workpiece.

The invention expands the range of colours of pigmented ceramic glazes on fired or unfired bricks, floor and wall tiles for indoor or outdoor use, sanitary ceramics, such as bathtubs, washbasins and toilet pans, porcelain crockery, earthenware and ceramicware by attractive interference colours (silver, gold, bronze, copper, red, violet, blue, turquoise, green), and with so-called mass tone pearlescent pigments, which are distinguished by a combination of interference and absorption colour, in particular in the region of gold, brass, bronze, copper, red and green shades. It furthermore also facilitates entirely novel colour effects, such as viewing angle-dependent so-called colour flop effects. The choice of the pearlescent pigment furthermore facilitates novel optical effects, such as sparkle/glitter effects and coarse or fine structures.

The invention also relates to the use of the ceramic colour according to the invention for ceramic glazes on fired or unfired bricks, floor and wall tiles for indoor or outdoor use, sanitary ceramics, porcelain, enamel, metallic workpieces, earthenware and ceramicware. The ceramic colour can be applied onto the unglazed, the glazed or the glazed and fired body.

The invention also relates to the use of a ceramic colour according to the invention for the manufacture of decorative elements on articles exhibiting an outer surface of porcelain, china, bone china, ceramic, glass or enamel.

The invention thus also relates to formulations comprising the ceramic colour according to the invention. Especially mentioned are transfer media for transfer printing on workpieces described.

The invention also relates to glazed articles such as fired or unfired bricks, floor and wall tiles for indoor or outdoor use, sanitary ceramics, porcelain, enamel, metallic workpieces, earthenware and ceramicware comprising a ceramic glaze based on the ceramic colours according to the invention.

According to the invention, the ceramic colours can preferably be prepared by combining the pearlescent pigments with a respective amount of liquid glass forming component and printing medium. After homogenisation of the mixture, it can be applied to a workpiece by conventional methods.

The ceramic colour may be applied imagewise in order to produce optical patterns or over a large area.

The ceramic colour may be applied as printed image in order to produce optical patterns or over a large area.

The ceramic colour obtained can be applied to workpieces by standard printing processes such as slip processes, spray application or transfer printing.

The ceramic colours are preferably applied by screen printing on ceramic articles. For flat surfaces direct printing can be used and for uneven surfaces transfer printing with transfer media can be used. In principal, the ceramic colour may be applied by all printing processes usable for the workpiece (i.e. ink-jet printing, flexographic printing, thermoplastic transfer printing, intaglio printing, tampon printing).

Furthermore, the ceramic can also be applied by methods used for coating like spraying, by doctor blade, painting, dip coating, waterfall application. Especially in enamel techniques, dip or bath coating are also common. Preferred examples are screen printing in direct or transfer print.

However, hand decoration by brush, stamping or by writing with a pencil can also be used.

Preferably, a ceramic colour according to the invention is used in a process for the preparation of ceramic glazes and glazed articles comprising the following steps:
(a) preparing a ceramic colour according to the invention by mixing at least one effect pigment based on a flake-form substrates and/or at least one uncoated flake-form substrate with a refractive index>1.5, at least one liquid glass forming component, optionally a solvent, optionally a binder, optionally an absorptive ceramic pigment and optionally at least one additive,
(b) printing or coating the ceramic colour obtained in step (a) on a ceramic or metallic body,
(c) drying the ceramic or metallic body obtained in step (b),
(d) firing the ceramic or metallic body obtained in step (c) at a temperature in the range of 450° C.-1300° C.

Alternatively, the disclosed ceramic colour can be prepared by a process which includes mixing together at least one effect pigment based on a flake-form substrates and/or at least one uncoated flake-form substrate with a refractive index R.I. >1.5, at least one liquid glass forming component, optionally a solvent, optionally a binder, optionally an absorptive ceramic pigment and optionally at least one additive.

Furthermore, in an alternative embodiment, a process for preparing a glazed article can contain only three steps, which includes
(a) printing or coating the ceramic colour disclosed herein on a ceramic or metallic body,
(b) drying the ceramic or metallic body obtained in step (a), and
(c) firing the ceramic or metallic body obtained in step (b) at a temperature in the range of 450° C.-1300° C.

After application of the ceramic colour, the coated workpiece can preferably dried by heating in a drying cabinet or fume hood at temperatures in the range of 60-110° C. in order to evaporate the solvent present.

The printed or coated and dried ceramic articles are then fired at a temperature in the range of 700° C.-1300° C., preferably 800° C.-1200° C., in particular 850-1150° C.

The printed or coated and dried metallic articles are then fired at a temperature in the range of 450° C.-950° C., preferably 500° C.-900° C., in particular 550° C.-850° C.

The printed or coated and dried ceramic or metallic articles are then fired with firing cycles (heating+holding+cooling) of 0.5-72 hour, preferably 0.5-30 hours, in particular 0.5-3 hours.

Holding time itself varies from 1 minute-68 hours, preferably 1 min-25 hours, in particular 1 minute-2 hours.

Heating time itself varies from 0.2-36 hour, preferably 0.25-15 hours, in particular 0.25-4 hours.

Cooling time itself varies from 0.2-36 hour, preferably 0.25-15 hours, in particular 0.25-4 hours.

Preferably, the printed and dried articles are fired in a firing furnace by means of a temperature profile, for example
180 min: heating to 1100° C.,
3 min: holding at 1100° C.,
120 min: rapid cooling to 600° C.,
300 min: slow cooling to room temperature.

Ceramic colours according to the invention provide ceramic layers showing improved surface gloss levels compared to colours of the state of the art based on frits. This gloss arises from the optimal orientation of the effect pigments in the ceramic colour according to the invention. Thus, the surface is not disturbed by disoriented effect pigments like in case of mixtures with a frit (as shown in FIGS. 1 and 2).

Preferably, gloss values are measured by a common gloss measuring instrument (Byk-Mac-Trigloss). These values provide information on surface gloss and are therefore quality criteria for a smooth surface. Detailed information on the measurement process and the gloss values to be used can be found in the manufacturer's brochure of Byk-Mac.

Preferably, ceramic layers made from a ceramic colour according to the invention, especially ceramic layers prepared according to the process described in the foregoing show a gloss level $L^*$ at $20°$>3, preferably >4.

Preferably, ceramic layers made from a ceramic colour according to the invention, especially ceramic layers prepared according to the process described show a gloss level $L^*$ at $60°$>10, preferably >15.

Preferably, ceramic layers made from a ceramic colour according to the invention, especially ceramic layers prepared according to the process described show a gloss level $L^*$ at $85°$ °>20, preferably >25.

Preferably, ceramic layers made from a ceramic colour according to the invention, especially ceramic layers prepared according to the process described show a gloss level $L^*$ at $20°$ at $20°$>3, a gloss level $L^*$ at $60°$>10, and a gloss level $L^*$ at $85°$>20.

Preferably, ceramic layers based on silver interference pigments printed with a liquid glass forming component according to the invention, especially with a pre-ceramic polymer according to the invention show less discolorations than state of the art layers. The silver white pigments show a higher stability and a better orientation. This shows up in a more pure silver shade.

Furthermore, it can be seen that for effect pigments having a mass tone considerably higher tinting strength and gloss can be achieved by the improved orientation of the effect pigments. The ceramic colours printed with a liquid glass forming component according to the invention, especially with a pre-ceramic polymer show a higher $L^*$ value than comparative colours with a frit.

Preferred embodiments of the invention comprise the components, especially the effect pigment and the liquid glass forming component, and/or the process conditions in their preferred, especially in their particularly preferred variants. Especially preferred are combinations wherein all components and features are in their particularly preferred variants.

In an embodiment, the ceramic colour disclosed herein does not contain particular frit, e.g., glass frit, or the pigment in the ceramic colour does not contain a protective coating.

The following examples are intended to explain the invention, but without limiting it.

EXAMPLES

For the preparation of ceramic colours, the effect pigments according to Examples 1 to 298 are weighed out and homogenised with the corresponding amount of liquid glass forming component and printing oil 221 ME by Ferro The liquid glass forming component is a polysilsesquioxane and has a resulting solid content of 26% after firing.

The pearlescent pigments used in the examples are all commercially available and have the compositions listed in Table 2 (in the "Particle size" column, the $d_{10}$-$d_{90}$ value is measured using a Malvern is indicated in each case):

The printing paste obtained are applied to tiles by means of doctor blade and screen printing. In all cases, the printed tile is dried in a drying cabinet or fume hood at temperatures of 60-110° C. in order to evaporate the solvent present in the printing oil.

The printed and dried tiles are then fired in a firing furnace by means of a temperature profile in accordance with FIG. 3.

180 min: heating to 1100° C.,
3 min: holding at 1100° C.,
120 min: rapid cooling to 600° C.,
300 min: slow cooling to room temperature.

The temperature programme as a function of time is depicted in FIG. 3.

The glazed tiles of the examples according to the invention are distinguished by the fact that the desired optical effects are stable and accessible in a reproducible manner in respective high-temperature applications 500-1300° C.

TABLE 1

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 1 | 0.01 | Xirallic © Crystal Silver (Merck KGaA) | 1 | 2 | 0.99 | 3.65 |
| 2 | 0.15 | Xirallic © Crystal Silver (Merck KGaA) | 0.5 | 2 | 23.08 | 53.17 |
| 3 | 0.3 | Xirallic © Crystal Silver (Merck KGaA) | 0.25 | 2 | 54.55 | 81.96 |
| 4 | 0.5 | Xirallic © Crystal Silver (Merck KGaA) | 0.05 | 2 | 90.91 | 97.43 |
| 5 | 0.01 | Xirallic © Crystal Silver (Merck KGaA) | 1 | 3 | 0.99 | 3.65 |
| 6 | 0.15 | Xirallic © Crystal Silver (Merck KGaA) | 0.5 | 3 | 23.08 | 53.17 |
| 7 | 0.3 | Xirallic © Crystal Silver (Merck KGaA) | 0.25 | 3 | 54.55 | 81.96 |
| 8 | 0.5 | Xirallic © Crystal Silver (Merck KGaA) | 0.05 | 3 | 90.91 | 97.43 |
| 9 | 0.01 | Xirallic © Crystal Silver (Merck KGaA) | 2 | 2 | 0.50 | 1.86 |
| 10 | 0.15 | Xirallic © Crystal Silver (Merck KGaA) | 1.5 | 2 | 9.09 | 27.46 |
| 11 | 0.3 | Xirallic © Crystal Silver (Merck KGaA) | 1 | 2 | 23.08 | 53.17 |
| 12 | 0.5 | Xirallic © Crystal Silver (Merck KGaA) | 0.5 | 2 | 50.00 | 79.10 |
| 13 | 0.01 | Xirallic © Crystal Silver (Merck KGaA) | 0.01 | 2 | 50.00 | 79.10 |
| 14 | 0.15 | Xirallic © Crystal Silver (Merck KGaA) | 3 | 2 | 4.76 | 15.91 |
| 15 | 0.3 | Xirallic © Crystal Silver (Merck KGaA) | 1.2 | 2 | 20.00 | 48.62 |
| 16 | 0.5 | Xirallic © Crystal Silver (Merck KGaA) | 0.7 | 2 | 41.67 | 73.00 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 17 | 4.5 | Xirallic © Crystal Silver (Merck KGaA) | 0.5 | 2 | 90.00 | 97.15 |
| 18 | 0.5 | Xirallic © Crystal Silver (Merck KGaA) | 0.25 | 2 | 66.67 | 88.33 |
| 19 | 4.9 | Xirallic © Crystal Silver (Merck KGaA) | 0.1 | 2 | 98.00 | 99.46 |
| 20 | 0.01 | Iriodin © 103 (Merck KGaA) | 1 | 2 | 0.99 | 3.65 |
| 21 | 0.15 | Iriodin © 103 (Merck KGaA) | 0.5 | 2 | 23.08 | 53.17 |
| 22 | 0.3 | Iriodin © 103 (Merck KGaA) | 0.25 | 2 | 54.55 | 81.96 |
| 23 | 0.5 | Iriodin © 103 (Merck KGaA) | 0.05 | 2 | 90.91 | 97.43 |
| 24 | 0.01 | Iriodin © 103 (Merck KGaA) | 1 | 3 | 0.99 | 3.65 |
| 25 | 0.15 | Iriodin © 103 (Merck KGaA) | 0.5 | 3 | 23.08 | 53.17 |
| 26 | 0.3 | Iriodin © 103 (Merck KGaA) | 0.25 | 3 | 54.55 | 81.96 |
| 27 | 0.5 | Iriodin © 103 (Merck KGaA) | 0.05 | 3 | 90.91 | 97.43 |
| 28 | 0.01 | Iriodin © 103 (Merck KGaA) | 2 | 2 | 0.50 | 1.86 |
| 29 | 0.15 | Iriodin © 103 (Merck KGaA) | 1.5 | 2 | 9.09 | 27.46 |
| 30 | 0.3 | Iriodin © 103 (Merck KGaA) | 1 | 2 | 23.08 | 53.17 |
| 31 | 0.5 | Iriodin © 103 (Merck KGaA) | 0.5 | 2 | 50.00 | 79.10 |
| 32 | 0.01 | Iriodin © 103 (Merck KGaA) | 0.01 | 2 | 50.00 | 79.10 |
| 33 | 0.15 | Iriodin © 103 (Merck KGaA) | 3 | 2 | 4.76 | 15.91 |
| 34 | 0.3 | Iriodin © 103 (Merck KGaA) | 1.2 | 2 | 20.00 | 48.62 |
| 35 | 0.5 | Iriodin © 103 (Merck KGaA) | 0.7 | 2 | 41.67 | 73.00 |
| 36 | 4.5 | Iriodin © 103 (Merck KGaA) | 0.5 | 2 | 90.00 | 97.15 |
| 37 | 0.5 | Iriodin © 103 (Merck KGaA) | 0.25 | 2 | 66.67 | 88.33 |
| 38 | 4.9 | Iriodin © 103 (Merck KGaA) | 0.1 | 2 | 98.00 | 99.46 |
| 39 | 0.01 | Iriodin © 305 (Merck KGaA) | 1 | 2 | 0.99 | 3.65 |
| 40 | 0.15 | Iriodin © 305 (Merck KGaA) | 0.5 | 2 | 23.08 | 53.17 |
| 41 | 0.3 | Iriodin © 305 (Merck KGaA) | 0.25 | 2 | 54.55 | 81.96 |
| 42 | 0.5 | Iriodin © 305 (Merck KGaA) | 0.05 | 2 | 90.91 | 97.43 |
| 43 | 0.01 | Iriodin © 305 (Merck KGaA) | 1 | 3 | 0.99 | 3.65 |
| 44 | 0.15 | Iriodin © 305 (Merck KGaA) | 0.5 | 3 | 23.08 | 53.17 |
| 45 | 0.3 | Iriodin © 305 (Merck KGaA) | 0.25 | 3 | 54.55 | 81.96 |
| 46 | 0.5 | Iriodin © 305 (Merck KGaA) | 0.05 | 3 | 90.91 | 97.43 |
| 47 | 0.01 | Iriodin © 305 (Merck KGaA) | 2 | 2 | 0.50 | 1.86 |
| 48 | 0.15 | Iriodin © 305 (Merck KGaA) | 1.5 | 2 | 9.09 | 27.46 |
| 49 | 0.3 | Iriodin © 305 (Merck KGaA) | 1 | 2 | 23.08 | 53.17 |
| 50 | 0.5 | Iriodin © 305 (Merck KGaA) | 0.5 | 2 | 50.00 | 79.10 |
| 51 | 0.01 | Iriodin © 305 (Merck KGaA) | 0.01 | 2 | 50.00 | 79.10 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 52 | 0.15 | Iriodin © 305 (Merck KGaA) | 3 | 2 | 4.76 | 15.91 |
| 53 | 0.3 | Iriodin © 305 (Merck KGaA) | 1.2 | 2 | 20.00 | 48.62 |
| 54 | 0.5 | Iriodin © 305 (Merck KGaA) | 0.7 | 2 | 41.67 | 73.00 |
| 55 | 4.5 | Iriodin © 305 (Merck KGaA) | 0.5 | 2 | 90.00 | 97.15 |
| 56 | 0.5 | Iriodin © 305 (Merck KGaA) | 0.25 | 2 | 66.67 | 88.33 |
| 57 | 4.9 | Iriodin © 305 (Merck KGaA) | 0.1 | 2 | 98.00 | 99.46 |
| 58 | 0.01 | Iriodin © 4504 Lava Red (Merck KGaA) | 1 | 2 | 0.99 | 3.65 |
| 59 | 0.15 | Iriodin © 4504 Lava Red (Merck KGaA) | 0.5 | 2 | 23.08 | 53.17 |
| 60 | 0.3 | Iriodin © 4504 Lava Red (Merck KGaA) | 0.25 | 2 | 54.55 | 81.96 |
| 61 | 0.5 | Iriodin © 4504 Lava Red (Merck KGaA) | 0.05 | 2 | 90.91 | 97.43 |
| 62 | 0.01 | Iriodin © 4504 Lava Red (Merck KGaA) | 1 | 3 | 0.99 | 3.65 |
| 63 | 0.15 | Iriodin © 4504 Lava Red (Merck KGaA) | 0.5 | 3 | 23.08 | 53.17 |
| 64 | 0.3 | Iriodin © 4504 Lava Red (Merck KGaA) | 0.25 | 3 | 54.55 | 81.96 |
| 65 | 0.5 | Iriodin © 4504 Lava Red (Merck KGaA) | 0.05 | 3 | 90.91 | 97.43 |
| 66 | 0.01 | Iriodin © 4504 Lava Red (Merck KGaA) | 2 | 2 | 0.50 | 1.86 |
| 67 | 0.15 | Iriodin © 4504 Lava Red (Merck KGaA) | 1.5 | 2 | 9.09 | 27.46 |
| 68 | 0.3 | Iriodin © 4504 Lava Red (Merck KGaA) | 1 | 2 | 23.08 | 53.17 |
| 69 | 0.5 | Iriodin © 4504 Lava Red (Merck KGaA) | 0.5 | 2 | 50.00 | 79.10 |
| 70 | 0.01 | Iriodin © 4504 Lava Red (Merck KGaA) | 0.01 | 2 | 50.00 | 79.10 |
| 71 | 0.15 | Iriodin © 4504 Lava Red (Merck KGaA) | 3 | 2 | 4.76 | 15.91 |
| 72 | 0.3 | Iriodin © 4504 Lava Red (Merck KGaA) | 1.2 | 2 | 20.00 | 48.62 |
| 73 | 0.5 | Iriodin © 4504 Lava Red (Merck KGaA) | 0.7 | 2 | 41.67 | 73.00 |
| 74 | 4.5 | Iriodin © 4504 Lava Red (Merck KGaA) | 0.5 | 2 | 90.00 | 97.15 |
| 75 | 0.5 | Iriodin © 4504 Lava Red (Merck KGaA) | 0.25 | 2 | 66.67 | 88.33 |
| 76 | 4.9 | Iriodin © 4504 Lava Red (Merck KGaA) | 0.1 | 2 | 98.00 | 99.46 |
| 77 | 0.01 | Iriodin © 9219 (Merck KGaA) | 1 | 2 | 0.99 | 3.65 |
| 78 | 0.15 | Iriodin © 9219 (Merck KGaA) | 0.5 | 2 | 23.08 | 53.17 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilses- quioxane [%] |
| --- | --- | --- | --- | --- | --- | --- |
| 79 | 0.3 | Iriodin © 9219 (Merck KGaA) | 0.25 | 2 | 54.55 | 81.96 |
| 80 | 0.5 | Iriodin © 9219 (Merck KGaA) | 0.05 | 2 | 90.91 | 97.43 |
| 81 | 0.01 | Iriodin © 9219 (Merck KGaA) | 1 | 3 | 0.99 | 3.65 |
| 82 | 0.15 | Iriodin © 9219 (Merck KGaA) | 0.5 | 3 | 23.08 | 53.17 |
| 83 | 0.3 | Iriodin © 9219 (Merck KGaA) | 0.25 | 3 | 54.55 | 81.96 |
| 84 | 0.5 | Iriodin © 9219 (Merck KGaA) | 0.05 | 3 | 90.91 | 97.43 |
| 85 | 0.01 | Iriodin © 9219 (Merck KGaA) | 2 | 2 | 0.50 | 1.86 |
| 86 | 0.15 | Iriodin © 9219 (Merck KGaA) | 1.5 | 2 | 9.09 | 27.46 |
| 87 | 0.3 | Iriodin © 9219 (Merck KGaA) | 1 | 2 | 23.08 | 53.17 |
| 88 | 0.5 | Iriodin © 9219 (Merck KGaA) | 0.5 | 2 | 50.00 | 79.10 |
| 89 | 0.01 | Iriodin © 9219 (Merck KGaA) | 0.01 | 2 | 50.00 | 79.10 |
| 90 | 0.15 | Iriodin © 9219 (Merck KGaA) | 3 | 2 | 4.76 | 15.91 |
| 91 | 0.3 | Iriodin © 9219 (Merck KGaA) | 1.2 | 2 | 20.00 | 48.62 |
| 92 | 0.5 | Iriodin © 9219 (Merck KGaA) | 0.7 | 2 | 41.67 | 73.00 |
| 93 | 4.5 | Iriodin © 9219 (Merck KGaA) | 0.5 | 2 | 90.00 | 97.15 |
| 94 | 0.5 | Iriodin © 9219 (Merck KGaA) | 0.25 | 2 | 66.67 | 88.33 |
| 95 | 4.9 | Iriodin © 9219 (Merck KGaA) | 0.1 | 2 | 98.00 | 99.46 |
| 96 | 0.01 | Iriodin © 9444 (Merck KGaA) | 1 | 2 | 0.99 | 3.65 |
| 97 | 0.15 | Iriodin © 9444 (Merck KGaA) | 0.5 | 2 | 23.08 | 53.17 |
| 98 | 0.3 | Iriodin © 9444 (Merck KGaA) | 0.25 | 2 | 54.55 | 81.96 |
| 99 | 0.5 | Iriodin © 9444 (Merck KGaA) | 0.05 | 2 | 90.91 | 97.43 |
| 100 | 0.01 | Iriodin © 9444 (Merck KGaA) | 1 | 3 | 0.99 | 3.65 |
| 101 | 0.15 | Iriodin © 9444 (Merck KGaA) | 0.5 | 3 | 23.08 | 53.17 |
| 102 | 0.3 | Iriodin © 9444 (Merck KGaA) | 0.25 | 3 | 54.55 | 81.96 |
| 103 | 0.5 | Iriodin © 9444 (Merck KGaA) | 0.05 | 3 | 90.91 | 97.43 |
| 104 | 0.01 | Iriodin © 9444 (Merck KGaA) | 2 | 2 | 0.50 | 1.86 |
| 105 | 0.15 | Iriodin © 9444 (Merck KGaA) | 1.5 | 2 | 9.09 | 27.46 |
| 106 | 0.3 | Iriodin © 9444 (Merck KGaA) | 1 | 2 | 23.08 | 53.17 |
| 107 | 0.5 | Iriodin © 9444 (Merck KGaA) | 0.5 | 2 | 50.00 | 79.10 |
| 108 | 0.01 | Iriodin © 9444 (Merck KGaA) | 0.01 | 2 | 50.00 | 79.10 |
| 109 | 0.15 | Iriodin © 9444 (Merck KGaA) | 3 | 2 | 4.76 | 15.91 |
| 110 | 0.3 | Iriodin © 9444 (Merck KGaA) | 1.2 | 2 | 20.00 | 48.62 |
| 111 | 0.5 | Iriodin © 9444 (Merck KGaA) | 0.7 | 2 | 41.67 | 73.00 |
| 112 | 4.5 | Iriodin © 9444 (Merck KGaA) | 0.5 | 2 | 90.00 | 97.15 |
| 113 | 0.5 | Iriodin © 9444 (Merck KGaA) | 0.25 | 2 | 66.67 | 88.33 |
| 114 | 4.9 | Iriodin © 9444 (Merck KGaA) | 0.1 | 2 | 98.00 | 99.46 |
| 115 | 0.01 | Iriodin © 9504 (Merck KGaA) | 1 | 2 | 0.99 | 3.65 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilses- quioxane [%] |
|---|---|---|---|---|---|---|
| 116 | 0.15 | Iriodin © 9504 (Merck KGaA) | 0.5 | 2 | 23.08 | 53.17 |
| 117 | 0.3 | Iriodin © 9504 (Merck KGaA) | 0.25 | 2 | 54.55 | 81.96 |
| 118 | 0.5 | Iriodin © 9504 (Merck KGaA) | 0.05 | 2 | 90.91 | 97.43 |
| 119 | 0.01 | Iriodin © 9504 (Merck KGaA) | 1 | 3 | 0.99 | 3.65 |
| 120 | 0.15 | Iriodin © 9504 (Merck KGaA) | 0.5 | 3 | 23.08 | 53.17 |
| 121 | 0.3 | Iriodin © 9504 (Merck KGaA) | 0.25 | 3 | 54.55 | 81.96 |
| 122 | 0.5 | Iriodin © 9504 (Merck KGaA) | 0.05 | 3 | 90.91 | 97.43 |
| 123 | 0.01 | Iriodin © 9504 (Merck KGaA) | 2 | 2 | 0.50 | 1.86 |
| 124 | 0.15 | Iriodin © 9504 (Merck KGaA) | 1.5 | 2 | 9.09 | 27.46 |
| 125 | 0.3 | Iriodin © 9504 (Merck KGaA) | 1 | 2 | 23.08 | 53.17 |
| 126 | 0.5 | Iriodin © 9504 (Merck KGaA) | 0.5 | 2 | 50.00 | 79.10 |
| 127 | 0.01 | Iriodin © 9504 (Merck KGaA) | 0.01 | 2 | 50.00 | 79.10 |
| 128 | 0.15 | Iriodin © 9504 (Merck KGaA) | 3 | 2 | 4.76 | 15.91 |
| 129 | 0.3 | Iriodin © 9504 (Merck KGaA) | 1.2 | 2 | 20.00 | 48.62 |
| 130 | 0.5 | Iriodin © 9504 (Merck KGaA) | 0.7 | 2 | 41.67 | 73.00 |
| 131 | 4.5 | Iriodin © 9504 (Merck KGaA) | 0.5 | 2 | 90.00 | 97.17 |
| 132 | 0.5 | Iriodin © 9504 (Merck KGaA) | 0.25 | 2 | 66.67 | 88.33 |
| 133 | 4.9 | Iriodin © 9504 (Merck KGaA) | 0.1 | 2 | 98.00 | 99.46 |
| 134 | 0.01 | Xirallic © F60-50 (Merck KGaA) | 1 | 2 | 0.99 | 3.65 |
| 135 | 0.15 | Xirallic © F60-50 (Merck KGaA) | 0.5 | 2 | 23.08 | 53.17 |
| 136 | 0.3 | Xirallic © F60-50 (Merck KGaA) | 0.25 | 2 | 54.55 | 81.96 |
| 137 | 0.5 | Xirallic © F60-50 (Merck KGaA) | 0.05 | 2 | 90.91 | 97.43 |
| 138 | 0.01 | Xirallic © F60-50 (Merck KGaA) | 1 | 3 | 0.99 | 3.65 |
| 139 | 0.15 | Xirallic © F60-50 (Merck KGaA) | 0.5 | 3 | 23.08 | 53.17 |
| 140 | 0.3 | Xirallic © F60-50 (Merck KGaA) | 0.25 | 3 | 54.55 | 81.96 |
| 141 | 0.5 | Xirallic © F60-50 (Merck KGaA) | 0.05 | 3 | 90.91 | 97.43 |
| 142 | 0.01 | Xirallic © F60-50 (Merck KGaA) | 2 | 2 | 0.50 | 1.86 |
| 143 | 0.15 | Xirallic © F60-50 (Merck KGaA) | 1.5 | 2 | 9.09 | 27.46 |
| 144 | 0.3 | Xirallic © F60-50 (Merck KGaA) | 1 | 2 | 23.08 | 53.17 |
| 145 | 0.5 | Xirallic © F60-50 (Merck KGaA) | 0.5 | 2 | 50.00 | 79.10 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 146 | 0.01 | Xirallic © F60-50 (Merck KGaA) | 0.01 | 2 | 50.00 | 79.10 |
| 147 | 0.15 | Xirallic © F60-50 (Merck KGaA) | 3 | 2 | 4.76 | 15.91 |
| 148 | 0.3 | Xirallic © F60-50 (Merck KGaA) | 1.2 | 2 | 20.00 | 48.62 |
| 149 | 0.5 | Xirallic © F60-50 (Merck KGaA) | 0.7 | 2 | 41.67 | 73.00 |
| 150 | 4.5 | Xirallic © F60-50 (Merck KGaA) | 0.5 | 2 | 90.00 | 97.15 |
| 151 | 0.5 | Xirallic © F60-50 (Merck KGaA) | 0.25 | 2 | 66.67 | 88.33 |
| 152 | 4.9 | Xirallic © F60-50 (Merck KGaA) | 0.1 | 2 | 98.00 | 99.46 |
| 153 | 0.01 | Xirallic © F60-51 (Merck KGaA) | 1 | 2 | 0.99 | 3.65 |
| 154 | 0.15 | Xirallic © F60-51 (Merck KGaA) | 0.5 | 2 | 23.08 | 53.17 |
| 155 | 0.3 | Xirallic © F60-51 (Merck KGaA) | 0.25 | 2 | 54.55 | 81.96 |
| 156 | 0.5 | Xirallic © F60-51 (Merck KGaA) | 0.05 | 2 | 90.91 | 97.43 |
| 157 | 0.01 | Xirallic © F60-51 (Merck KGaA) | 1 | 3 | 0.99 | 3.65 |
| 158 | 0.15 | Xirallic © F60-51 (Merck KGaA) | 0.5 | 3 | 23.08 | 53.17 |
| 159 | 0.3 | Xirallic © F60-51 (Merck KGaA) | 0.25 | 3 | 54.55 | 81.96 |
| 160 | 0.5 | Xirallic © F60-51 (Merck KGaA) | 0.05 | 3 | 90.91 | 97.43 |
| 161 | 0.01 | Xirallic © F60-51 (Merck KGaA) | 2 | 2 | 0.50 | 1.86 |
| 162 | 0.15 | Xirallic © F60-51 (Merck KGaA) | 1.5 | 2 | 9.09 | 27.46 |
| 163 | 0.3 | Xirallic © F60-51 (Merck KGaA) | 1 | 2 | 23.08 | 53.17 |
| 164 | 0.5 | Xirallic © F60-51 (Merck KGaA) | 0.5 | 2 | 50.00 | 79.10 |
| 165 | 0.01 | Xirallic © F60-51 (Merck KGaA) | 0.01 | 2 | 50.00 | 79.10 |
| 166 | 0.15 | Xirallic © F60-51 (Merck KGaA) | 3 | 2 | 4.76 | 15.91 |
| 167 | 0.3 | Xirallic © F60-51 (Merck KGaA) | 1.2 | 2 | 20.00 | 48.62 |
| 168 | 0.5 | Xirallic © F60-51 (Merck KGaA) | 0.7 | 2 | 41.67 | 73.00 |
| 169 | 4.5 | Xirallic © F60-51 (Merck KGaA) | 0.5 | 2 | 90.00 | 97.15 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 170 | 0.5 | Xirallic © F60-51 (Merck KGaA) | 0.25 | 2 | 66.67 | 88.33 |
| 171 | 4.9 | Xirallic © F60-51 (Merck KGaA) | 0.1 | 2 | 98.00 | 99.46 |
| 172 | 0.01 | Pyrisma © M40-58 (Merck KGaA) | 1 | 2 | 0.99 | 3.65 |
| 173 | 0.15 | Pyrisma © M40-58 (Merck KGaA) | 0.5 | 2 | 23.08 | 53.17 |
| 174 | 0.3 | Pyrisma © M40-58 (Merck KGaA) | 0.25 | 2 | 54.55 | 81.96 |
| 175 | 0.5 | Pyrisma © M40-58 (Merck KGaA) | 0.05 | 2 | 90.91 | 97.43 |
| 176 | 0.01 | Pyrisma © M40-58 (Merck KGaA) | 1 | 3 | 0.99 | 3.65 |
| 177 | 0.15 | Pyrisma © M40-58 (Merck KGaA) | 0.5 | 3 | 23.08 | 53.17 |
| 178 | 0.3 | Pyrisma © M40-58 (Merck KGaA) | 0.25 | 3 | 54.55 | 81.96 |
| 179 | 0.5 | Pyrisma © M40-58 (Merck KGaA) | 0.05 | 3 | 90.91 | 97.43 |
| 180 | 0.01 | Pyrisma © M40-58 (Merck KGaA) | 2 | 2 | 0.50 | 1.86 |
| 181 | 0.15 | Pyrisma © M40-58 (Merck KGaA) | 1.5 | 2 | 9.09 | 27.46 |
| 182 | 0.3 | Pyrisma © M40-58 (Merck KGaA) | 1 | 2 | 23.08 | 53.17 |
| 183 | 0.5 | Pyrisma © M40-58 (Merck KGaA) | 0.5 | 2 | 50.00 | 79.10 |
| 184 | 0.01 | Pyrisma © M40-58 (Merck KGaA) | 0.01 | 2 | 50.00 | 79.10 |
| 185 | 0.15 | Pyrisma © M40-58 (Merck KGaA) | 3 | 2 | 4.76 | 15.91 |
| 186 | 0.3 | Pyrisma © M40-58 (Merck KGaA) | 1.2 | 2 | 20.00 | 48.62 |
| 187 | 0.5 | Pyrisma © M40-58 (Merck KGaA) | 0.7 | 2 | 41.67 | 73.00 |
| 188 | 4.5 | Pyrisma © M40-58 (Merck KGaA) | 0.5 | 2 | 90.00 | 97.15 |
| 189 | 0.5 | Pyrisma © M40-58 (Merck KGaA) | 0.25 | 2 | 66.67 | 88.33 |
| 190 | 4.9 | Pyrisma © M40-58 (Merck KGaA) | 0.1 | 2 | 98.00 | 99.46 |
| 191 | 0.5 | SynCrystal © Silver (Eckart GmbH) | 0.25 | 2 | 66.67 | 88.33 |
| 192 | 0.5 | SYMIC © B001 Silber (Eckart GmbH) | 0.25 | 2 | 66.67 | 88.33 |
| 193 | 0.5 | SYMIC © C001 Silber (Eckart GmbH) | 0.25 | 2 | 66.67 | 88.33 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 194 | 0.5 | SYMIC © C604 Silber (Eckart GmbH) | 0.25 | 2 | 66.67 | 88.33 |
| 195 | 0.5 | SYMIC © OEM X-fine Silver (Eckart GmbH) | 0.25 | 2 | 66.67 | 88.33 |
| 196 | 0.5 | SYMIC © C393 Gold (Eckart GmbH) | 0.25 | 2 | 66.67 | 88.33 |
| 197 | 0.5 | SYMIC © C522 Erdfarbton Kupfer (Eckart GmbH) | 0.25 | 2 | 66.67 | 88.33 |
| 198 | 0.5 | SYMIC © C542 Erdfarbton Feuer-Rot (Eckart GmbH) | 0.25 | 2 | 66.67 | 88.33 |
| 199 | 0.5 | SYMIC © OEM Medium Space Gold (Eckart GmbH) | 0.25 | 2 | 66.67 | 88.33 |
| 200 | 0.5 | Magnapearl © 1000 (BASF AG) | 0.25 | 2 | 66.67 | 88.33 |
| 201 | 0.5 | Magnapearl © 2000 (BASF AG) | 0.25 | 2 | 66.67 | 88.33 |
| 202 | 0.5 | Magnapearl © 3100 (BASF AG) | 0.25 | 2 | 66.67 | 88.33 |
| 203 | 0.5 | Lumina © Brass 9232D (BASF AG) | 0.25 | 2 | 66.67 | 88.33 |
| 204 | 0.5 | Lumina © Copper 9350D (BASF AG) | 0.25 | 2 | 66.67 | 88.33 |
| 205 | 0.5 | Lumina © Exterior Gold 2303D (BASF AG) | 0.25 | 2 | 66.67 | 88.33 |
| 206 | 0.5 | Lumina © Russet 9450D (BASF AG) | 0.25 | 2 | 66.67 | 88.33 |
| 207 | 0.5 | Lumina © Royal Copper (BASF AG) | 0.25 | 2 | 66.67 | 88.33 |
| 208 | 0.5 | Lumina © Royal Magenta (BASF AG) | 0.25 | 2 | 66.67 | 88.33 |
| 209 | 0.5 | Lumina © Royal Blue (BASF AG) | 0.25 | 2 | 66.67 | 88.33 |
| 210 | 0.5 | Exterior Polar White KC9119-SW (Fujian Kuncai Fine Chemicals Co., Ltd.) | 0.25 | 2 | 66.67 | 88.33 |
| 211 | 0.5 | Exterior Sterling White KC9103-SW (Fujian Kuncai Fine Chemicals Co., Ltd.) | 0.25 | 2 | 66.67 | 88.33 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilses- quioxane [%] |
|---|---|---|---|---|---|---|
| 212 | 0.5 | Exterior Fine Gold Satin KC9201-SW (Fujian Kuncai Fine Chemicals Co., Ltd.) | 0.25 | 2 | 66.67 | 88.33 |
| 213 | 0.5 | Exterior Platinum Pearl KC9205-SW (Fujian Kuncai Fine Chemicals Co., Ltd.) | 0.25 | 2 | 66.67 | 88.33 |
| 214 | 0.5 | Exterior Gold Pearl KC9300-SW (Fujian Kuncai Fine Chemicals Co., Ltd.) | 0.25 | 2 | 66.67 | 88.3 |
| 215 | 0.5 | Exterior Royal Gold KC9303-SW (Fujian Kuncai Fine Chemicals Co., Ltd.) | 0.25 | 2 | 66.67 | 88.33 |
| 216 | 0.5 | Exterior Royal Gold Satin KC9323-SW (Fujian Kuncai Fine Chemicals Co., Ltd.) | 0.25 | 2 | 66.67 | 88.33 |
| 217 | 0.5 | Exterior Bright Gold KC9307-SW (Fujian Kuncai Fine Chemicals Co., Ltd.) | 0.25 | 2 | 66.67 | 88.33 |
| 218 | 0.5 | Exterior Bronze KC9502-SW (Fujian Kuncai Fine Chemicals Co., Ltd.) | 0.25 | 2 | 66.67 | 88.33 |
| 219 | 0.5 | Exterior Wine Red KC9504-SW (Fujian Kuncai Fine Chemicals Co., Ltd.) | 0.25 | 2 | 66.67 | 88.33 |
| 220 | 0.5 | Exterior Ruby KC9508-SW (Fujian Kuncai Fine Chemicals Co., Ltd.) | 0.25 | 2 | 66.67 | 88.33 |
| 221 | 0.01 | ADAMAS © A-100D (CQV Co., Ltd.) | 1 | 2 | 0.99 | 3.65 |
| 222 | 0.15 | ADAMAS © A-100D (CQV Co., Ltd.) | 0.5 | 2 | 23.08 | 53.17 |
| 223 | 0.3 | ADAMAS © A-100D (CQV Co., Ltd.) | 0.25 | 2 | 54.55 | 81.96 |
| 224 | 0.5 | ADAMAS © A-100D (CQV Co., Ltd.) | 0.05 | 2 | 90.91 | 97.43 |
| 225 | 0.01 | ADAMAS © A-100D (CQV Co., Ltd.) | 1 | 3 | 0.99 | 3.65 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilses-quioxane [%] |
|---|---|---|---|---|---|---|
| 226 | 0.15 | ADAMAS © A-100D (CQV Co., Ltd.) | 0.5 | 3 | 23.08 | 53.17 |
| 227 | 0.5 | ADAMAS © A-901K Splendor White (CQV Co., Ltd.) | 0.25 | 2 | 66.67 | 88.33 |
| 228 | 0.5 | ADAMAS © A-901S Dazzling White (CQV Co., Ltd.) | 0.25 | 2 | 66.67 | 88.33 |
| 229 | 0.15 | ADAMAS © A-901S Dazzling White (CQV Co., Ltd.) | 0.5 | 2 | 23.08 | 53.17 |
| 230 | 0.3 | ADAMAS © A-901S Dazzling White (CQV Co., Ltd.) | 0.25 | 2 | 54.55 | 81.96 |
| 231 | 0.5 | ADAMAS © A-901K Splendor Gold (CQV Co., Ltd.) | 0.25 | 2 | 66.67 | 88.33 |
| 232 | 0.15 | ADAMAS © A-901K Splendor Gold (CQV Co., Ltd.) | 0.5 | 2 | 23.08 | 53.17 |
| 233 | 0.3 | ADAMAS © A-901K Splendor Gold (CQV Co., Ltd.) | 0.25 | 2 | 54.55 | 81.96 |
| 234 | 0.5 | ADAMAS © A-701S Dazzling Gold (CQV Co., Ltd.) | 0.25 | 2 | 66.67 | 88.33 |
| 235 | 0.15 | ADAMAS © A-701S Dazzling Gold (CQV Co., Ltd.) | 0.5 | 2 | 23.08 | 53.17 |
| 236 | 0.3 | ADAMAS © A-701S Dazzling Gold (CQV Co., Ltd.) | 0.25 | 2 | 54.55 | 81.96 |
| 237 | 0.5 | ADAMAS © A-741S Dazzling Red (CQV Co., Ltd.) | 0.25 | 2 | 66.67 | 88.33 |
| 238 | 0.5 | ADAMAS © A-781K Splendor Blue (CQV Co., Ltd.) | 0.25 | 2 | 66.67 | 88.33 |
| 239 | 0.5 | ADAMAS © A-781S Dazzling Blue (CQV Co., Ltd.) | 0.25 | 2 | 66.67 | 88.33 |
| 240 | 0.5 | ADAMAS © A-620S Dazzling Bronze (CQV Co., Ltd.) | 0.25 | 2 | 66.67 | 88.33 |
| 241 | 0.15 | ADAMAS © A-620S Dazzling Bronze (CQV Co., Ltd.) | 0.5 | 2 | 23.08 | 53.17 |
| 242 | 0.3 | ADAMAS © A-620S Dazzling Bronze (CQV Co., Ltd.) | 0.25 | 2 | 54.55 | 81.96 |
| 243 | 0.5 | ADAMAS © A-640K | 0.25 | 2 | 66.67 | 88.33 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 244 | 0.15 | Splendor Copper (CQV Co., Ltd.) ADAMAS © A-640K Splendor Copper (CQV Co., Ltd.) | 0.5 | 2 | 23.08 | 53.17 |
| 245 | 0.3 | ADAMAS © A-640K Splendor Copper (CQV Co., Ltd.) | 0.25 | 2 | 54.55 | 81.96 |
| 246 | 0.5 | ADAMAS © A-640S Dazzling Copper (CQV Co., Ltd.) | 0.25 | 2 | 66.67 | 88.33 |
| 247 | 0.15 | ADAMAS © A-640S Dazzling Copper (CQV Co., Ltd.) | 0.5 | 2 | 23.08 | 53.17 |
| 248 | 0.3 | ADAMAS © A-640S Dazzling Copper (CQV Co., Ltd.) | 0.25 | 2 | 54.55 | 81.96 |
| 249 | 0.5 | ADAMAS © A-660K Splendor Russet (CQV Co., Ltd.) | 0.25 | 2 | 66.67 | 88.33 |
| 250 | 0.15 | ADAMAS © A-660K Splendor Russet (CQV Co., Ltd.) | 0.5 | 2 | 23.08 | 53.17 |
| 251 | 0.3 | ADAMAS © A-660K Splendor Russet (CQV Co., Ltd.) | 0.25 | 2 | 54.55 | 81.96 |
| 252 | 0.5 | ADAMAS © A-660S Dazzling Russet (CQV Co., Ltd.) | 0.25 | 2 | 66.67 | 88.33 |
| 253 | 0.5 | CHAOS © C-901M Rutile Ultra Silk (CQV Co., Ltd.) | 0.25 | 2 | 66.67 | 88.33 |
| 254 | 0.5 | CHAOS © C-901D Rutile Fine White (CQV Co., Ltd.) | 0.25 | 2 | 66.67 | 88.33 |
| 255 | 0.5 | CHAOS © C-900D Fine White (CQV Co., Ltd.) | 0.25 | 2 | 66.67 | 88.33 |
| 256 | 0.5 | CHAOS © C-907K Skye White (CQV Co., Ltd.) | 0.25 | 2 | 66.67 | 88.33 |
| 257 | 0.5 | CHAOS © C-901K Splendor White (CQV Co., Ltd.) | 0.25 | 2 | 66.67 | 88.33 |
| 258 | 0.5 | CHAOS © C-901S Rutile Dazzling Standard (CQV Co., Ltd.) | 0.25 | 2 | 66.67 | 88.33 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilses- quioxane [%] |
|---|---|---|---|---|---|---|
| 259 | 0.5 | CHAOS © C-900S Dazzling Standard (CQV Co., Ltd.) | 0.25 | 2 | 66.67 | 88.33 |
| 260 | 0.5 | CHAOS © C-902S Super White (CQV Co., Ltd.) | 0.25 | 2 | 66.67 | 88.33 |
| 261 | 0.5 | CHAOS © C-109S Super Pearl (CQV Co., Ltd.) | 0.25 | 2 | 66.67 | 88.33 |
| 262 | 0.5 | CHAOS © C-109B Shimmering White (CQV Co., Ltd.) | 0.25 | 2 | 66.67 | 88.33 |
| 263 | 0.5 | CHAOS © C-901E Glitter Pearl (CQV Co., Ltd.) | 0.25 | 2 | 66.67 | 88.33 |
| 264 | 0.5 | FERRIUS © F-620K Splendor Bronze (CQV Co., Ltd.) | 0.25 | 2 | 66.67 | 88.33 |
| 265 | 0.5 | FERRIUS © F-630K Splendor Orange (CQV Co., Ltd.) | 0.25 | 2 | 66.67 | 88.33 |
| 266 | 0.5 | FERRIUS © F-640K Splendor Copper (CQV Co., Ltd.) | 0.25 | 2 | 66.67 | 88.33 |
| 267 | 0.5 | FERRIUS © F-660K Splendor Russet (CQV Co., Ltd.) | 0.25 | 2 | 66.67 | 88.33 |
| 268 | 0.5 | FERRIUS © F-620P Crystal Bronze (CQV Co., Ltd.) | 0.25 | 2 | 66.67 | 88.33 |
| 269 | 0.5 | FERRIUS © F-630P Crystal Orange (CQV Co., Ltd.) | 0.25 | 2 | 66.67 | 88.33 |
| 270 | 0.5 | FERRIUS © F-640P Crystal Copper (CQV Co., Ltd.) | 0.25 | 2 | 66.67 | 88.33 |
| 271 | 0.5 | FERRIUS © F-660P Crystal Russet (CQV Co., Ltd.) | 0.25 | 2 | 66.67 | 88.33 |
| 272 | 0.5 | Magchrom © N-5001C Natural Corona Gold (CQV Co., Ltd.) | 0.25 | 2 | 66.67 | 88.33 |
| 273 | 0.5 | Magchrom © N-5001S Natural Dazzling Gold (CQV Co., Ltd.) | 0.25 | 2 | 66.67 | 88.33 |
| 274 | 0.5 | Magchrom © S-7801C Corona Blue (CQV Co., Ltd.) | 0.25 | 2 | 66.67 | 88.33 |
| 275 | 0.5 | REFLEX © RCN-1008S | 0.25 | 2 | 66.67 | 88.33 |

TABLE 1-continued

| Example No. | Pigment [g] | Pearlescent Pigment Name | Glass forming Matrix [g] | Screen Printing Medium [g] | $W_{Pigm}$ in Polymer [%] | $W_{Pigm}$ after Firing in Polysilsesquioxane [%] |
|---|---|---|---|---|---|---|
| 276 | 0.5 | Snow White Pearl (CQV Co., Ltd.) Thermaval © Metallic Silver (Merck KGaA) | 0.25 | 2 | 66.67 | 88.33 |
| 277 | 0.5 | Thermaval © Metallic Gold (Merck KGaA) | 0.25 | 2 | 66.67 | 88.33 |
| 278 | 0.5 | Thermaval © Metallic Red (Merck KGaA) | 0.25 | 2 | 66.67 | 88.33 |
| 279 | 0.5 | Thermaval © Metallic Copper (Merck KGaA) | 0.25 | 2 | 66.67 | 88.33 |
| 280 | 0.01 | Iriodin © 325 (Merck KGaA) | 1 | 2 | 0.99 | 21.60 |
| 281 | 0.15 | Iriodin © 325 (Merck KGaA) | 0.5 | 2 | 23.08 | 89.21 |
| 282 | 0.3 | Iriodin © 325 (Merck KGaA) | 0.25 | 2 | 54.55 | 97.06 |
| 283 | 0.5 | Iriodin © 325 (Merck KGaA) | 0.05 | 2 | 90.91 | 99.64 |
| 284 | 0.01 | Iriodin © 325 (Merck KGaA) | 1 | 3 | 0.99 | 21.60 |
| 285 | 0.15 | Iriodin © 325 (Merck KGaA) | 0.5 | 3 | 23.08 | 89.21 |
| 286 | 0.3 | Iriodin © 325 (Merck KGaA) | 0.25 | 3 | 54.55 | 97.06 |
| 287 | 0.5 | Iriodin © 325 (Merck KGaA) | 0.05 | 3 | 90.91 | 99.64 |
| 288 | 0.01 | Iriodin © 325 (Merck KGaA) | 2 | 2 | 0.50 | 12.11 |
| 289 | 0.15 | Iriodin © 325 (Merck KGaA) | 1.5 | 2 | 9.09 | 73.37 |
| 290 | 0.3 | Iriodin © 325 (Merck KGaA) | 1 | 2 | 23.08 | 89.21 |
| 291 | 0.5 | Iriodin © 325 (Merck KGaA) | 0.5 | 2 | 50.00 | 96.50 |
| 292 | 0.01 | Iriodin © 325 (Merck KGaA) | 0.01 | 2 | 50.00 | 96.50 |
| 293 | 0.15 | Iriodin © 325 (Merck KGaA) | 3 | 2 | 4.76 | 57.94 |
| 294 | 0.3 | Iriodin © 325 (Merck KGaA) | 1.2 | 2 | 20.00 | 87.32 |
| 295 | 0.5 | Iriodin © 325 (Merck KGaA) | 0.7 | 2 | 41.67 | 95.16 |
| 296 | 4.5 | Iriodin © 325 (Merck KGaA) | 0.5 | 2 | 90.00 | 99.60 |
| 297 | 0.5 | Iriodin © 325 (Merck KGaA) | 0.25 | 2 | 66.67 | 98.22 |
| 298 | 4.9 | Iriodin © 325 (Merck KGaA) | 0.1 | 2 | 98.00 | 99.93 |

TABLE 2

| Trade name | Manufacturer | Substrate | Coating | Particle size [μm] |
|---|---|---|---|---|
| Xirallic © Crystal Silver | Merck KGaA | $Al_2O_3$ | $TiO_2$ | 5-35 |
| Iriodin © 103 | Merck KGaA | Natural mica | $TiO_2$ | 10-60 |
| Iriodin © 305 | Merck KGaA | Natural mica | $Fe_2O_3$ and $TiO_2$ | 10-60 |
| Iriodin © 4504 Lava Red | Merck KGaA | $SiO_2$ | $Fe_2O_3$ | 5-50 |
| Iriodin © 9219 | Merck KGaA | Natural mica | $TiO_2$ | 10-60 |
| Iriodin © 9444 | Merck KGaA | Natural mica | $Cr_2O_3$ | 5-40 |
| Iriodin © 9504 | Merck KGaA | Natural mica | $Fe_2O_3$ | 10-60 |
| Xirallic © F60-50 | Merck KGaA | $Al_2O_3$ | $Fe_2O_3$ | 5-35 |
| Xirallic © F60-51 | Merck KGaA | $Al_2O_3$ | $Fe_2O_3$ | 5-35 |

TABLE 2-continued

| Trade name | Manufacturer | Substrate | Coating | Particle size [μm] |
|---|---|---|---|---|
| Pyrisma © M40-58 | Merck KGaA | Natural mica | $Fe_2O_3$ and $TiO_2$ | 5-40 |
| SynCrystal © Silver | Eckart GmbH | Synthetic mica | $TiO_2$ | 10-50 |
| SYMIC © B001 Silver | Eckart GmbH | Synthetic mica | $TiO_2$ | 5-25 |
| SYMIC © C001 Silver | Eckart GmbH | Synthetic mica | $TiO_2$ | 10-40 |
| SYMIC © C604 Silver | Eckart GmbH | Synthetic mica | $TiO_2$ | 10-40 |
| SYMIC © OEM X-fine Silver | Eckart GmbH | Synthetic mica | $TiO_2$ | 3-15 |
| SYMIC © C393 Gold | Eckart GmbH | Synthetic mica | $Fe_2O_3$ and $TiO_2$ | 10-40 |
| SYMIC © C522 Copper Earth Shade | Eckart GmbH | Synthetic mica | $Fe_2O_3$ | 10-40 |
| SYMIC © C542 Fire Red Earth Shade | Eckart GmbH | Synthetic mica | $Fe_2O_3$ | 10-40 |
| SYMIC © OEM Medium Space Gold | Eckart GmbH | Synthetic mica | $Fe_2O_3$ and $TiO_2$ | 12-38 |
| Magnapearl © 1000 | BASF AG | Natural mica | $TiO_2$ | 6-48 |
| Magnapearl © 2000 | BASF AG | Natural mica | $TiO_2$ | 5-25 |
| Magnapearl © 3100 | BASF AG | Natural mica | $TiO_2$ | 2-10 |
| Lumina © Brass 9232D | BASF AG | Natural mica | $Fe_2O_3$ and $TiO_2$ | 10-48 |
| Lumina © Copper 9350D | BASF AG | Natural mica | $Fe_2O_3$ | 8-48 |
| Lumina © Exterior Gold 2303D | BASF AG | Natural mica | $TiO_2$ | 8-48 |
| Lumina © Russet 9450D | BASF AG | Natural mica | $Fe_2O_3$ | 8-48 |
| Lumina © Royal Copper | BASF AG | Natural mica | $TiO_2$ | 10-34 |
| Lumina © Royal Magenta | BASF AG | Natural mica | $TiO_2$ | 10-34 |
| Lumina © Royal Blue | BASF AG | Natural mica | $TiO_2$ | 10-34 |
| Exterior Polar White KC9119-SW | Fujian Kuncai Fine Chemicals Co., Ltd. | Natural mica | $TiO_2$ | 5-25 |
| Exterior Sterling White KC9103-SW | Fujian Kuncai Fine Chemicals Co., Ltd. | Natural mica | $TiO_2$ | 10-45 |
| Exterior Fine Gold Satin KC9201-SW | Fujian Kuncai Fine Chemicals Co., Ltd. | Natural mica | $TiO_2$ | 5-25 |
| Exterior Platinum Pearl KC9205-SW | Fujian Kuncai Fine Chemicals Co., Ltd. | Natural mica | $TiO_2$ | 10-45 |
| Exterior Royal Gold KC9303-SW | Fujian Kuncai Fine Chemicals Co., Ltd. | Natural mica | $Fe_2O_3$ and $TiO_2$ | 10-45 |
| Exterior Royal Gold Satin KC9323-SW | Fujian Kuncai Fine Chemicals Co., Ltd. | Natural mica | $Fe_2O_3$ and $TiO_2$ | 5-25 |
| Exterior Bright Gold KC9307-SW | Fujian Kuncai Fine Chemicals Co., Ltd. | Natural mica | $Fe_2O_3$ and $TiO_2$ | 10-60 |
| Exterior Brown KC9502-SW | Fujian Kuncai Fine Chemicals Co., Ltd. | Natural mica | $Fe_2O_3$ | 8-45 |
| Exterior Wine Red KC9504-SW | Fujian Kuncai Fine Chemicals Co., Ltd. | Natural mica | $Fe_2O_3$ | 8-45 |
| Exterior Ruby KC9508-SW | Fujian Kuncai Fine Chemicals Co., Ltd. | Natural mica | $Fe_2O_3$ | 8-45 |
| ADAMAS © A-100D | CQV Co., Ltd. | $Al_2O_3$ | $TiO_2$ | 3-30 |
| ADAMAS © A-901K Splendor White | CQV Co., Ltd. | $Al_2O_3$ | $TiO_2$ | 5-30 |
| ADAMAS © A-901S Dazzling White | CQV Co., Ltd. | $Al_2O_3$ | $TiO_2$ | 9-45 |
| ADAMAS © A-901K Splendor Gold | CQV Co., Ltd. | $Al_2O_3$ | $TiO_2$ | 5-30 |
| ADAMAS © A-701S Dazzling Gold | CQV Co., Ltd. | $Al_2O_3$ | $TiO_2$ | 9-45 |
| ADAMAS © A-741S Dazzling Red | CQV Co., Ltd. | $Al_2O_3$ | $TiO_2$ | 9-45 |

TABLE 2-continued

| Trade name | Manufacturer | Substrate | Coating | Particle size [μm] |
|---|---|---|---|---|
| ADAMAS © A-781K Splendor Blue | CQV Co., Ltd. | $Al_2O_3$ | $TiO_2$ | 5-30 |
| ADAMAS © A-781S Dazzling Blue | CQV Co., Ltd. | $Al_2O_3$ | $TiO_2$ | 9-45 |
| ADAMAS © A-620S Dazzling Bronze | CQV Co., Ltd. | $Al_2O_3$ | $Fe_2O_3$ | 9-45 |
| ADAMAS © A-640S Dazzling Copper | CQV Co., Ltd. | $Al_2O_3$ | $Fe_2O_3$ | 9-45 |
| ADAMAS © A-660S Dazzling Russet | CQV Co., Ltd. | $Al_2O_3$ | $Fe_2O_3$ | 9-45 |
| CHAOS © C-901M Rutile Ultra Silk | CQV Co., Ltd. | Synthetic mica | $TiO_2$ | 3-17 |
| CHAOS © C-901D Rutile Fine White | CQV Co., Ltd. | Synthetic mica | $TiO_2$ | 5-25 |
| CHAOS © C-900D Fine White | CQV Co., Ltd. | Synthetic mica | $TiO_2$ | 5-25 |
| CHAOS © C-907K Sky White | CQV Co., Ltd. | Synthetic mica | $TiO_2$ | 5-35 |
| CHAOS © C-901K Splendor White | CQV Co., Ltd. | Synthetic mica | $TiO_2$ | 5-35 |
| CHAOS © C-901S Rutile Dazzling Standard | CQV Co., Ltd. | Synthetic mica | $TiO_2$ | 9-45 |
| CHAOS © C-900S Dazzling Standard | CQV Co., Ltd. | Synthetic mica | $TiO_2$ | 9-45 |
| CHAOS © C-902S Super White | CQV Co., Ltd. | Synthetic mica | $TiO_2$ | 9-45 |
| CHAOS © C-109S Super Pearl | CQV Co., Ltd. | Synthetic mica | $TiO_2$ | 9-41 |
| CHAOS © C-109B Shimmering White | CQV Co., Ltd. | Synthetic mica | $TiO_2$ | 13-60 |
| CHAOS © C-901E Glitter Pearl | CQV Co., Ltd. | Synthetic mica | $TiO_2$ | 17-100 |
| FERRIUS © F-620K Splendor Bronze | CQV Co., Ltd. | Synthetic mica | $Fe_2O_3$ | 5-35 |
| FERRIUS © F-630K Splendor Orange | CQV Co., Ltd. | Synthetic mica | $Fe_2O_3$ | 5-35 |
| FERRIUS © F-640K Splendor Copper | CQV Co., Ltd. | Synthetic mica | $Fe_2O_3$ | 5-35 |
| FERRIUS © F-660K Splendor Russet | CQV Co., Ltd. | Synthetic mica | $Fe_2O_3$ | 5-35 |
| FERRIUS © F-620P Crystal Bronze | CQV Co., Ltd. | Synthetic mica | $Fe_2O_3$ | 25-150 |
| FERRIUS © F-630P Crystal Orange | CQV Co., Ltd. | Synthetic mica | $Fe_2O_3$ | 25-150 |
| FERRIUS © F-640P Crystal Copper | CQV Co., Ltd. | Synthetic mica | $Fe_2O_3$ | 25-150 |
| FERRIUS © F-660P Crystal Russet | CQV Co., Ltd. | Synthetic mica | $Fe_2O_3$ | 25-150 |
| Magchrom © N-5001C Natural Corona Gold | CQV Co., Ltd. | Nat. mica | $TiO_2$ | 7-30 |
| Magchrom © N-5001S Natural Dazzling Gold | CQV Co., Ltd. | Nat. mica | $TiO_2$ | 9-45 |
| Magchrom © S-7801C Corona Blue | CQV Co., Ltd. | Synthetic mica | $TiO_2$ | 7-27 |

4 coated tiles of the example 1-275 are measured and compared to the respective mixture based on pigment and frit. The test tiles (firing at 1100° C.) are measured by a common colour measuring instrument (Byk-Mac) to give a statement on brilliance and chroma. Additionally, gloss values measured by a common gloss measuring instrument (Byk-Mac-Trigloss) are used. These values provide information on surface gloss and are therefore quality criteria for a smooth surface. Detailed information on the measurement process and the gloss values to be used can be found in the manufacturer's brochure of Byk-Mac.

A commercial frit from Ferro (FLUX 101911), which is suitable for this firing range, is used for the comparative examples.

Table 3 shows the values of specular colour measurement (15° away from the specular angle) by BYK Mac I for ceramic colours according to the invention and respective mixtures of pigment and frit.

TABLE 3

| Test body | Mean Value of L* | Mean Value of a* | Mean Value of b* |
|---|---|---|---|
| Porcelain pure | 85.642891 | −1.240811 | 0.797664 |
| Frit | 89.353989 | −1.127215 | 0.54104 |
| Polysilsesquioxane | 88.04554 | −0.889047 | 1.298175 |
| Iriodin © 100/Frit | 105.635033 | −1.140235 | 7.132583 |
| Iriodin © 100/Polymer | 110.634941 | −1.526905 | 0.175483 |

TABLE 3-continued

| Test body | Mean Value of L* | Mean Value of a* | Mean Value of b* |
|---|---|---|---|
| Lava Red Frit | 72.674736 | 13.959878 | −1.056682 |
| Lava Red Polymer | 85.261124 | 68.830589 | 33.313763 |

It is evident from the values of Table 3 that silver interference pigments (i.e. Iriodin© 100 printed with the pre-ceramic polymer according to the invention show less yellowing. This is apparent by a lower b* value compared to the respective porcelain flakes with frit.

So, the silver white pigments show a higher stability and a better orientation. This shows up in a more pure silver shade.

Furthermore, it can be seen that for effect pigments having a mass tone (i.e. Lava Red) considerably higher tinting strength and gloss can be achieved by the improved orientation of the pigments. The colours printed with the pre-ceramic polymer show a higher L* value than the comparative colours with a frit. The chroma is evident from the higher a* and b* values.

Table 4 shows the values of the gloss measurements by BYK Mac Trigloss for ceramic colours according to the invention and respective mixtures of pigment and frit.

TABLE 4

| Test body | Mean Value of L* at 20° | Mean Value of L* at 60° | Mean Value of L* at 85° |
|---|---|---|---|
| Porcelain pure | 12.75 | 47.28 | 65.84 |
| Frit | 13.95 | 49.34 | 68.99 |
| Polysilsesquioxane | 49.19 | 70.92 | 88.09 |
| Iriodin © 100/Frit | 1.70 | 5.49 | 1.91 |
| Iriodin © 100/Polymer | 24.59 | 76.06 | 72.89 |
| Lava Red Frit | 0.76 | 4.47 | 2.62 |
| Lava Red Polymer | 4.42 | 19.01 | 38.24 |

The gloss measurements provide a measure for the surface gloss. This gloss arises from the optimal orientation of the effect pigments in the ceramic colour according to the invention. Thus, the surface is not disturbed by disoriented effect pigments like in case of mixtures with a frit (as shown in FIGS. 1 and 2).

In all examples it is evident that the gloss values of a mixture of effect pigment and frit are lower than the values of a ceramic colour according to the invention comprising a liquid glass forming component.

The preceding examples can be repeated with similar success by substituting the generically or specifically described reactants and/or operating conditions of this invention for those used in the preceding examples.

Figure 1:
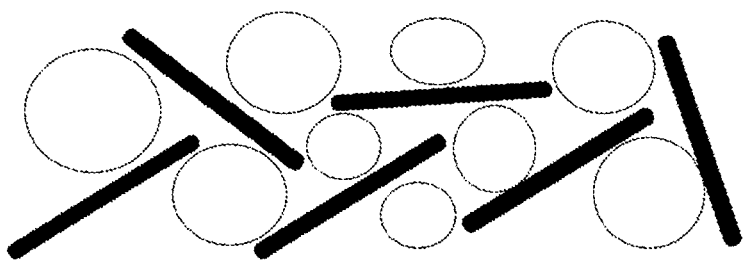
FIG. 1 illustrates that ceramic colours according to the invention eliminated or at least diminish the problem of strong loss of colour effect that is caused by the finite dimension of the frit particles which leads to a disorientation of the effect pigment particles.
Figure 2:
FIG. 2 illustrates that the invention provides an optimal orientation of the effect pigments based on flake-form substrates and the pearlescent effect and tinting strength can be improved.
Figure 3:
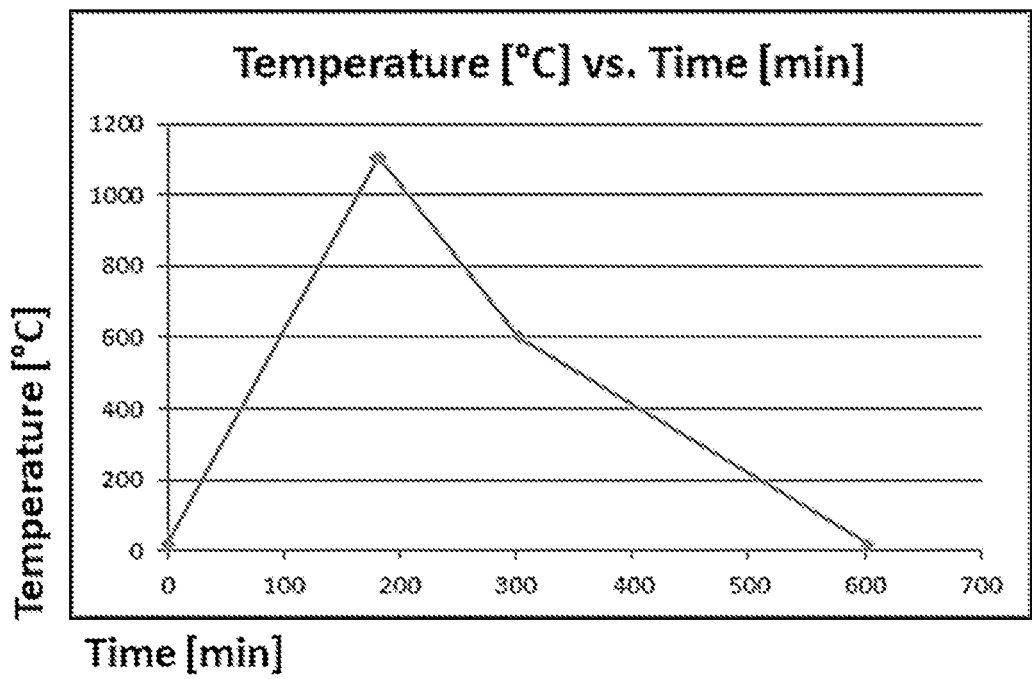
FIG. 3 illustrates the temperature programme as a function of time.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosure[s] of all applications, patents and publications, cited herein and of corresponding Singapore application No. 10201803809S, filed May 4, 2018 are incorporated by reference herein.

The invention claimed is:

1. A process for preparing a glazed article comprising:
   (a) printing or coating a ceramic colour on a ceramic or metallic body,
   (b) drying the ceramic or metallic body obtained in step (a),
   (c) firing the ceramic body obtained in step (b) at a temperature ≥1,000° C. or the metallic body obtained in step (b) at a temperature in the range of 450° C.-950° C.,
   wherein the ceramic colour comprises at least one liquid glass forming component that is a liquid polymer selected from polysilsesquioxanes and at least one effect pigment based on flake-form substrates, and optionally a solvent, optionally a binder, optionally an absorptive ceramic pigment and optionally at least one additive.

2. The process according to claim 1, wherein in step (c) the ceramic body is fired at a temperature in the range of 1,000-1,300° C. or the metallic body is fired at a temperature in the range of above 550-850° C.

3. The process according to claim 1, wherein the glazed article is selected from the group consisting of unfired bricks, fired bricks, unfired earthenware, fired earthenware, ceramicware, ceramic glazes, decorative tiles, porcelain glazes, metallic decoration and enamel.

4. The process according to claim 1, wherein the glazed article is an outer surface of a porcelain, china, bone china, ceramic, glass or enamel.

5. The process according to claim 1, comprising aligning the pigments in a nearly plane-parallel manner.

6. The process according to claim 1, wherein, in the glazed article, between the pigment particles after a firing and a projected surface of the coating there is an average angle, which average angle is between 0° and 30°.

7. The process according to claim 1, wherein, in the glazed article, a deviation to an average angle among the pigment particles is less than 30°.

8. The process according to claim 1, wherein the glazed article does not contain particular frit, or in which the pigment does not contain a protective coating.

9. The process according to claim 1, wherein the liquid polymer selected from polysilsesquioxanes is of formula

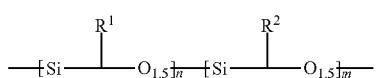

wherein

R$^1$ and R$^2$ are, each independently from each other, selected from the group consisting of hydrogen, alkyl, alkene, cycloalkyl, aryl, arylene and alkoxyl, and m and n are, each independently from each other, an integer selected from the numbers in the range of 1 to 100, with the proviso that the boiling point of the polysilsesquioxane exceeds 150° C.

10. The process according to claim 1, which comprises:
(a) printing or coating a ceramic colour on a ceramic body,
(b) drying the ceramic body obtained in step (a),
(c) firing the ceramic body obtained in step (b) at a temperature ≥1,000° C.

11. The process according to claim 1, which comprises:
(a) printing or coating a ceramic colour on a metallic body,
(b) drying the metallic body obtained in step (a),
(c) firing the metallic body obtained in step (b) at a temperature in the range of 450° C.-950° C.

12. The process according to claim 1, wherein, in the glazed article,
a deviation to an average angle among the pigment particles is less than 10°, or
between the pigment particles after a firing and a projected surface of the coating there is an average angle, which average angle is 0° or 180°.

13. The process according to claim 1, wherein, in the ceramic colour, the effect pigment is based on flake-form substrates selected from the group consisting of synthetic mica flakes, natural mica flakes, glassflakes, SiO$_2$ flakes Al$_2$O$_3$ flake, SiC flakes, Si$_x$N$_y$C$_z$ (with x=0.5-1.0; y=0.25-0.5; z=0.25-0.5), B$_4$C flakes, BN flakes, graphite flakes, TiO$_2$ flakes, and Fe$_2$O$_3$ flakes.

14. The process according to claim 1, wherein the proportion of effect pigment in the ceramic colour is at least 0.1% by weight based on the liquid glass forming component.

15. The process according to claim 1, wherein, in the ceramic colour, the flake-form substrates are covered with one or more layers of metal oxide(s), metal sulfides, rare-earth metal oxides and/or metal(s) or mixtures thereof.

16. The process according to claim 1, wherein, in the ceramic colour, the flake-form substrates are covered on the surface with one or more layers selected from the group consisting of TiO$_2$, MnO, CuO, CuCr$_2$O$_4$, Fe$_2$O$_3$, ZrO$_2$, SnO$_2$, TiO$_2$/Fe$_2$O$_3$, Fe$_2$TiO$_5$, FeTiO$_3$, FeOOH, Fe$_3$O$_4$, Cr$_2$O$_3$ and TiO$_x$, where x=1.50-1.95.

17. The process according to claim 1, wherein, in the ceramic colour, the flake-form substrates have a particle thickness of 0.05-5.0 μm.

18. The process according to claim 1, wherein the ceramic colour comprises a printing oil.

19. The process according to claim 1, wherein, in the ceramic colour, the effect pigments are selected from the following group of pigments:

substrate flake+TiO$_2$ substrate flake+Fe$_2$O$_3$ substrate flake+Fe$_3$O$_4$ substrate flake+TiO$_2$/Fe$_2$O$_3$ substrate flake+FeTiO$_3$ substrate flake+Fe$_2$TiO$_5$ substrate flake+ZrO$_2$ substrate flake+ZnO substrate flake+SnO$_2$ substrate flake+Cr$_2$O$_3$ substrate flake+Ce$_2$O$_3$ substrate flake+TiO$_x$ (reduced), where x=1.50-1.95 substrate flake+TiO$_2$+Fe$_2$O$_3$ substrate flake+TiO$_2$+Fe$_3$O$_4$ substrate flake+Fe$_2$O$_3$+TiO$_2$ substrate flake+TiO$_2$+SiO$_2$+TiO$_2$ substrate flake+TiO$_2$+SnO$_2$+TiO$_2$ substrate flake+TiO$_2$+Al$_2$O$_3$+TiO$_2$ substrate flake+Fe$_2$O$_3$+SiO$_2$+TiO$_2$ substrate flake+TiO$_2$/Fe$_2$O$_3$+SiO$_2$+TiO$_2$ substrate flake+TiO$_2$/Fe$_2$O$_3$+SiO$_2$+TiO$_2$/Fe$_2$O$_3$ substrate flake+TiO$_2$/Fe$_2$O$_3$+SiO$_2$+TiO$_2$+TiO$_2$/Fe$_2$O$_3$ substrate flake+TiO$_2$+SiO$_2$+TiO$_2$/Fe$_2$O$_3$ substrate flake+TiO$_2$+SiO$_2$ substrate flake+TiO$_2$+Al$_2$O$_3$ substrate flake+TiO$_2$+MgO×SiO$_2$+TiO$_2$ substrate flake+Fe$_2$O$_3$+MgO×SiO$_2$+TiO$_2$ substrate flake+TiO$_2$/Fe$_2$O$_3$+MgO×SiO$_2$+TiO$_2$ substrate flake+TiO$_2$/Fe$_2$O$_3$+MgO×SiO$_2$+TiO$_2$/Fe$_2$O$_3$ substrate flake+TiO$_2$/Fe$_2$O$_3$+MgO×SiO$_2$+TiO$_2$+TiO$_2$/Fe$_2$O$_3$ substrate flake+TiO$_2$+MgO×SiO$_2$+TiO$_2$/Fe$_2$O$_3$ substrate flake+SnO$_2$+TiO$_2$+SiO$_2$+SnO$_2$+TiO$_2$ substrate flake+SnO$_2$+TiO$_2$+SnO$_2$+TiO$_2$ substrate flake+SnO$_2$+TiO$_2$+Fe$_2$O$_3$+SiO$_2$+SnO$_2$+TiO$_2$+Fe$_2$O$_3$ substrate flake+Fe$_2$O$_3$+SnO$_2$+TiO$_2$ substrate flake+Fe$_2$O$_3$+SnO$_2$+Fe$_2$O$_3$ substrate flake+TiO$_2$+SnO$_2$+TiO$_2$ substrate flake+TiO$_2$/Fe$_2$O$_3$+SnO$_2$+TiO$_2$ substrate flake+TiO$_2$/Fe$_2$O$_3$+SnO$_2$+TiO$_2$/Fe$_2$O$_3$ substrate flake+SnO$_2$+TiO$_2$+Fe$_2$O$_3$+SnO$_2$+TiO$_2$+Fe$_2$O$_3$ substrate flake+Fe$_2$TiO$_5$+SnO$_2$+Fe$_2$TiO$_5$ and substrate flake+Fe$_2$TiO$_5$+SiO$_2$+Fe$_2$TiO$_5$.

20. The process according to claim 1, wherein, in the ceramic colour, the effect pigments on the substrate flake have a first low-refractive-index layer (=LRL) comprising $Al_2O_3$, $SiO_2$, zirconium silicate $ZrSiO_4$, mullite $3Al_2O_3 \times 2SiO_2$ or $2Al_2O_3 \times SiO_2$ (sintered or fused mullite) or alkaline-earth metal silicate ($MSiO_3$, where $M=Mg^{2+}$, $Ca^{2+}$, $Sr^{2+}$ or $Ba^{2+}$, or $M_2Si_3O_8$, where $M=Mg^{2+}$, $Ca^{2+}$, $Sr^{2+}$ or $Ba^{2+}$) and are selected from the following group of pigments:

substrate flake+LRL+$TiO_2$ substrate flake+LRL+$Fe_2O_3$ substrate flake+LRL+$Fe_3O_4$ substrate flake+LRL+$TiO_2$/$Fe_2O_3$ substrate flake+LRL+$FeTiO_3$ substrate flake+LRL+$Fe_2TiO_5$ substrate flake+LRL+$ZrO_2$ substrate flake+LRL+ZnO substrate flake+LRL+$SnO_2$ substrate flake+LRL+$Cr_2O_3$ substrate flake+LRL+$Ce_2O_3$ substrate flake+LRL+$TiO_x$ (reduced), where $x$=1.50-1.95 substrate flake+LRL+$TiO_2$+$Fe_2O_3$ substrate flake+LRL+$TiO_2$+$Fe_3O_4$ substrate flake+LRL+$Fe_2O_3$+$TiO_2$ substrate flake+LRL+$TiO_2$+$SiO_2$+$TiO_2$ substrate flake+LRL+$TiO_2$+$SnO_2$+$TiO_2$ substrate flake+LRL+$TiO_2$+$Al_2O_3$+$TiO_2$ substrate flake+LRL+$Fe_2O_3$+$SiO_2$+$TiO_2$ substrate flake+LRL+$TiO_2$/$Fe_2O_3$+$SiO_2$+$TiO_2$ substrate flake+LRL+$TiO_2$/$Fe_2O_3$+$SiO_2$+$TiO_2$/$Fe_2O_3$ substrate flake+LRL+$TiO_2$/$Fe_2O_3$+$SiO_2$+$TiO_2$+$TiO_2$/$Fe_2O_3$ substrate flake+LRL+$TiO_2$+$SiO_2$+$TiO_2$/$Fe_2O_3$ substrate flake+LRL+$TiO_2$+$SiO_2$ substrate flake+LRL+$TiO_2$+$Al_2O_3$ substrate flake+LRL+$TiO_2$+MgO×$SiO_2$+$TiO_2$ substrate flake+LRL+$Fe_2O_3$+MgO×$SiO_2$+$TiO_2$ substrate flake+LRL+$TiO_2$/$Fe_2O_3$+MgO×$SiO_2$+$TiO_2$ substrate flake+LRL+$TiO_2$/$Fe_2O_3$+MgO×$SiO_2$+$TiO_2$/$Fe_2O_3$ substrate flake+LRL+$TiO_2$/$Fe_2O_3$+MgO×$SiO_2$+$TiO_2$+$TiO_2$/$Fe_2O_3$ substrate flake+LRL+$TiO_2$+MgO×$SiO_2$+$TiO_2$/$Fe_2O_3$ substrate flake+LRL+$SnO_2$+$TiO_2$+$SiO_2$+$SnO_2$+$TiO_2$ substrate flake+LRL+$SnO_2$+$TiO_2$+$SnO_2$+$TiO_2$ substrate flake+LRL+$SnO_2$+$TiO_2$+$Fe_2O_3$+$SiO_2$+$SnO_2$+$TiO_2$+$Fe_2O_3$ substrate flake+LRL+$Fe_2O_3$+$SnO_2$+$TiO_2$ substrate flake+LRL+$Fe_2O_3$+$SnO_2$+$Fe_2O_3$ substrate flake+LRL+$TiO_2$+$SnO_2$+$TiO_2$ substrate flake+LRL+$TiO_2$/$Fe_2O_3$+$SnO_2$+$TiO_2$ substrate flake+LRL+$TiO_2$/$Fe_2O_3$+$SnO_2$+$TiO_2$/$Fe_2O_3$ substrate flake+LRL+$SnO_2$+$TiO_2$+$Fe_2O_3$+$SnO_2$+$TiO_2$+$Fe_2O_3$ substrate flake+LRL+$Fe_2TiO_5$+$SnO_2$+$Fe_2TiO_5$ and substrate flake+LRL+$Fe_2TiO_5$+$SiO_2$+$Fe_2TiO_5$.

21. A process for preparing a glazed article comprising:
(a) printing or coating a ceramic colour on a ceramic or metallic body,
(b) drying the ceramic or metallic body obtained in step (a),
(c) firing the ceramic body obtained in step (b) at a temperature ≥1,000° C. or the metallic body obtained in step (b) at a temperature in the range of 450° C.-950° C.,
wherein the ceramic colour comprises at least one liquid glass forming component that is a liquid polymer selected from polysilsesquioxanes and at least one effect pigment based on flake-form substrates, and optionally a solvent, optionally a binder, optionally an absorptive ceramic pigment and optionally at least one additive,
and wherein the ceramic colour in step (a) does not contain a glass frit.

22. A process for preparing a glazed article comprising:
(a) printing or coating a ceramic colour on a ceramic or metallic body,
(b) drying the ceramic or metallic body obtained in step (a),
(c) firing the ceramic body obtained in step (b) at a temperature ≥1,000° C. or the metallic body obtained in step (b) at a temperature in the range of 600° C.-950° C.,
wherein the ceramic colour comprises at least one liquid glass forming component that is a liquid polymer selected from polysilsesquioxanes and at least one effect pigment based on flake-form substrates, and optionally a solvent, optionally a binder, optionally an absorptive ceramic pigment and optionally at least one additive.

* * * * *